United States Patent [19]

Nakamura et al.

[11] Patent Number: 5,347,463
[45] Date of Patent: Sep. 13, 1994

[54] SYSTEM AND METHOD FOR LINE PRODUCTION MANAGEMENT

[75] Inventors: Shunji Nakamura; Toru Sakai, both of Suzuka, Japan

[73] Assignee: Honda Giken Kogyo Kabushiki Kaisha, Tokyo, Japan

[21] Appl. No.: 722,606

[22] Filed: Jun. 26, 1991

[30] Foreign Application Priority Data

| Jul. 3, 1990 | [JP] | Japan | 2-176155 |
| Aug. 3, 1990 | [JP] | Japan | 2-206123 |
| Aug. 3, 1990 | [JP] | Japan | 2-206124 |
| Aug. 3, 1990 | [JP] | Japan | 2-206125 |
| Sep. 13, 1990 | [JP] | Japan | 2-243594 |
| Sep. 13, 1990 | [JP] | Japan | 2-243595 |
| Sep. 13, 1990 | [JP] | Japan | 2-243596 |
| Sep. 13, 1990 | [JP] | Japan | 2-243597 |
| Sep. 13, 1990 | [JP] | Japan | 2-243599 |
| Oct. 18, 1990 | [JP] | Japan | 2-280154 |

[51] Int. Cl.⁵ .............. G06F 15/46; B65G 43/00; G07B 15/02
[52] U.S. Cl. .............. 364/478; 198/340; 235/384; 364/468
[58] Field of Search .............. 364/478, 468; 235/375, 235/437, 384, 385, 376, 440, 436; 209/569, 583; 198/392, 459, 460, 345, 340

[56] References Cited

U.S. PATENT DOCUMENTS

| 3,593,308 | 7/1971 | Fagan |  |
| 4,512,747 | 4/1985 | Hitchens et al. |  |
| 4,764,667 | 8/1988 | Abe et al. |  |
| 4,870,590 | 9/1989 | Kawata et al. | 364/478 |
| 4,991,719 | 2/1991 | Butcher et al. | 364/478 |
| 5,166,874 | 11/1992 | Nomaru et al. | 364/468 |

FOREIGN PATENT DOCUMENTS

| 0220380 | 7/1986 | European Pat. Off. |
| 0283034 | 3/1988 | European Pat. Off. |
| 60-108259 | 6/1985 | Japan |
| 61-38177 | 3/1986 | Japan |
| 61-151704 | 7/1986 | Japan |
| 62-11962 | 1/1987 | Japan |
| 62-188352 | 11/1987 | Japan |
| 62-255032 | 11/1987 | Japan |
| WO82/04077 | 11/1982 | PCT Int'l Appl. |
| WO82/04078 | 11/1982 | PCT Int'l Appl. |
| 3133750A1 | 3/1983 | PCT Int'l Appl. |
| 1107007 | 3/1968 | United Kingdom |
| 1394348 | 5/1975 | United Kingdom |
| 2232283A | 5/1990 | United Kingdom |

*Primary Examiner*—Jerry Smith
*Assistant Examiner*—Jim Trammell

[57] ABSTRACT

Information code for conveying devices on which an item to be processed is placed has the data of the same item to be processed stored as a set in a memory. The information code inputted into a register undergoes tracking corresponding to the conveyance of the item to be processed. Accordingly, by referring to the identification code in the register and the contents of the memory, it is possible to know the data relating to an item to be processed and the position thereof.

8 Claims, 38 Drawing Sheets

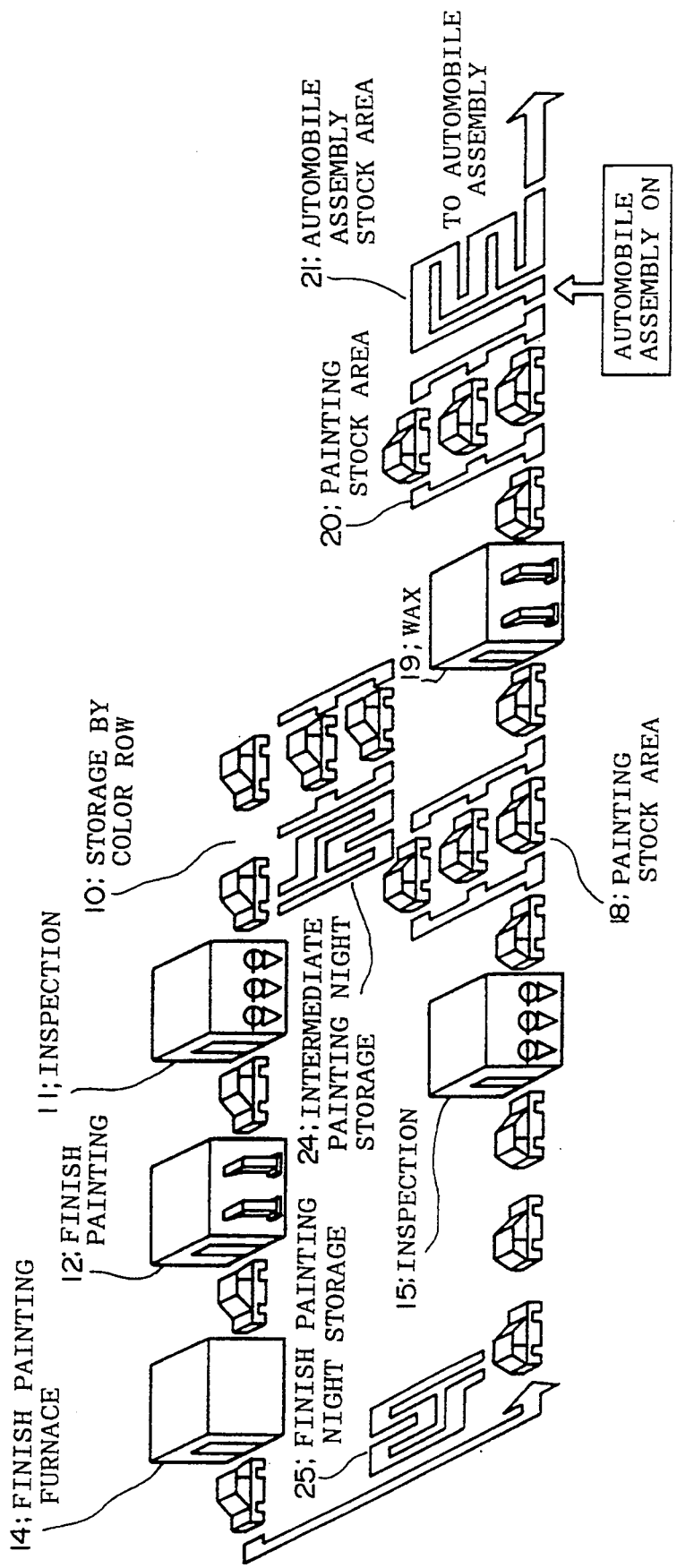

| | HANGER NUMBER | BODY DATA | | |
|---|---|---|---|---|
| A1 | ① | DOMESTIC, VEHICLE TYPE → A, COLOR → RED | -------- | FLAG |
| A2 | ② | DEMESTIC, VEHICLE TYPE → B, COLOR → BULE | -------- | FLAG |
| A3 | ③ | AMERICAN MARKET, VEHICLE TYPE → A, COLOR → BLACK | ---- | FLAG |
| | | | | |

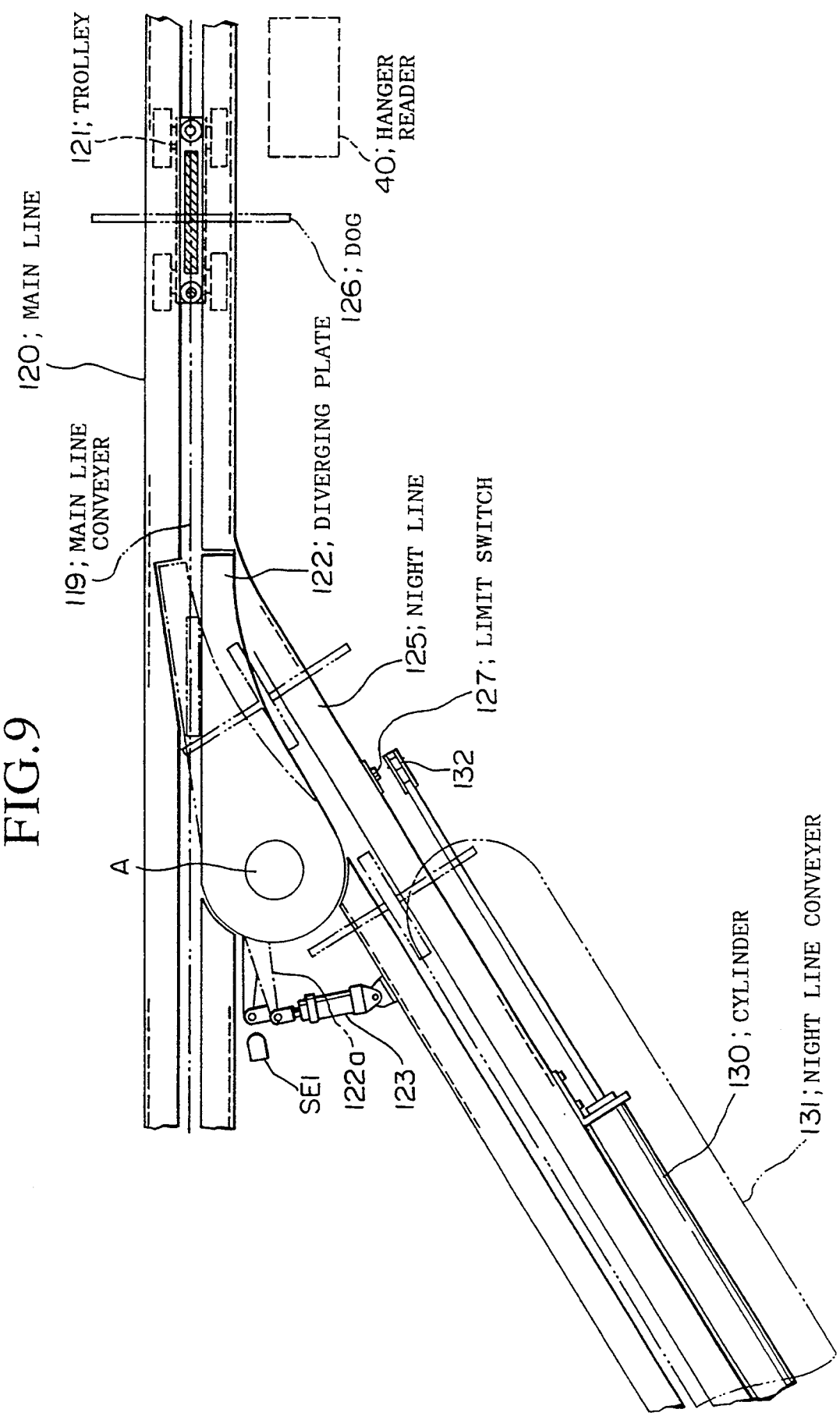

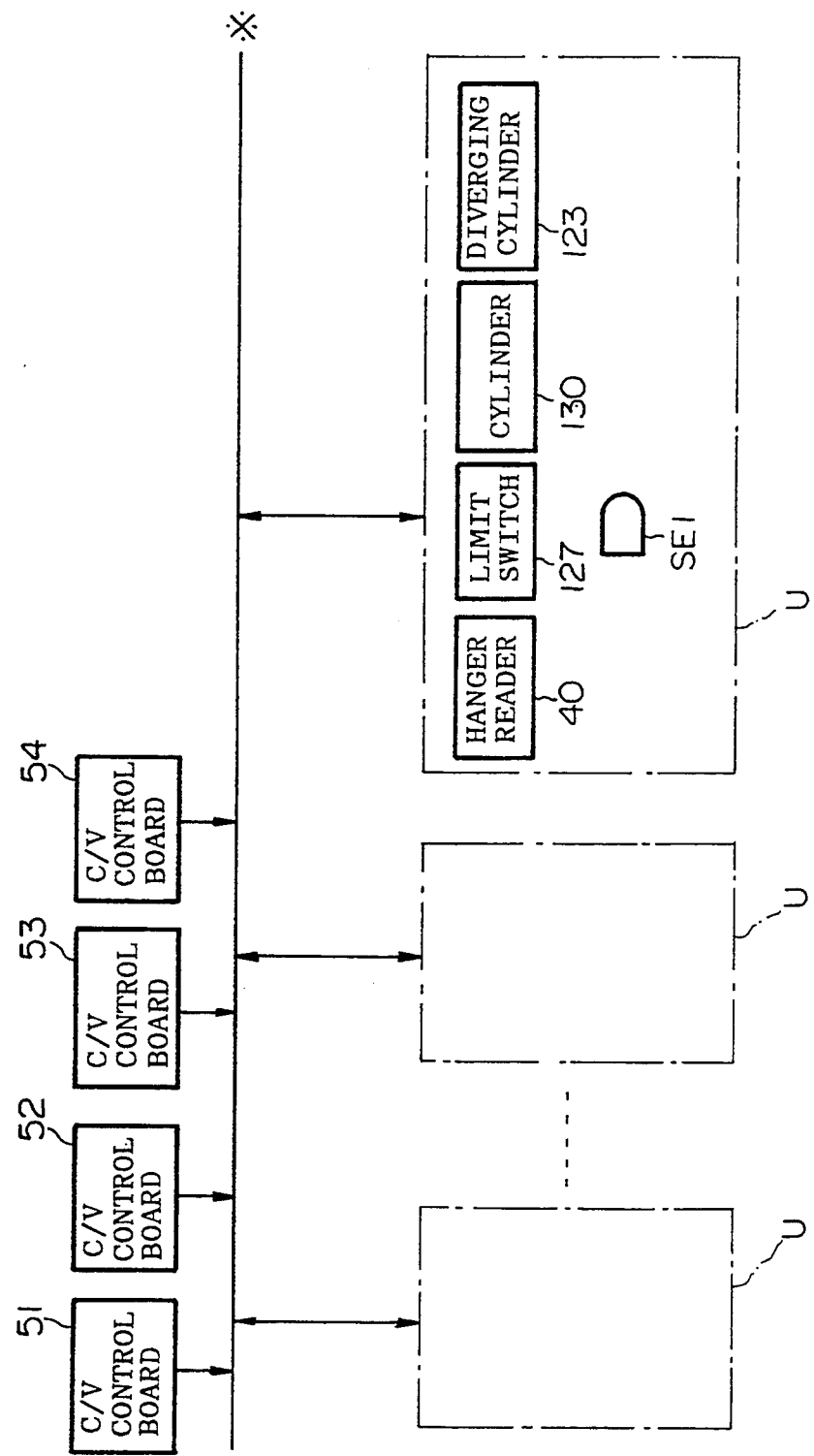

FIG. 11

| TYPE OF VEHICLE | DERI-VATION | COLOR NAME | MEMO | DESTINATION |
|---|---|---|---|---|
| | | | | |
| | | | | |
| | | | | |
| | | | | |
| | | | | |
| | | | | |
| | | | | |
| | | | | |

```
POINT SHIFT REPAIR
ALL DATA REPAIR
INDIVIDUAL DATA REPAIR CORRESPONDING TO
                                    HANGER NO.
FRAME DATA SHIFT REPAIR
TERMINATION PROCESSING
```

| 4 | 3204 |
| 5 | 3255 |
| 6 | 3206 |
| 7 | 3227 |
| 8 | 3248 |
| 9 | 3209 |
| 10 | 3230 |
| 11 | 3231 |
| 12 | |
| 13 | |
| 14 | |
| 15 | |
| 16 | |

USE ↑↓ KEYS TO SELECT PROGRAM

| 1 MENU | 2 | 3 | 4 | 5 COPY | 6 | 7 | 8 | 9 SELECT | 10 |

FIG. 12

PBS    TRACKING DATA (POINT SHIFT REPAIR)    1988/05/11  14:30:50
       ZONE  09

| POS | HNO. |
|---|---|
| 1 | 3040 |
| 2 | 3014 |
| 3 | 3023 |
| 4 | 3006 |
| 5 | 3009 |
| 6 | 3042 |
| 7 | 3051 |
| 8 | 3046 |
| 9 | 3024 |
| 10 | 3021 |
| 11 | 3011 |
| 12 |  |

1 MENU | 2 | 3 | 4 | 5 | 6 | 7 | 8 | 9 SELECT | 10

FIG. 13

PBS  TRACKING DATA (POINT SHIFT REPAIR)  1988/05/11 14:30:54
ZONE 09

| POS | HNO. |
|-----|------|
| 1 | 3040 |
| 2 | 3014 |
| 3 | 3023 |
| 4 | 3006 |
| 5 | 3009 |
| 6 | 3042 |
| 7 | 3051 |
| 8 | 3046 |
| 9 | 3024 |
| 10 | 3021 |
| 11 | 3011 |
| 12 | |

BLOCK SELECT
ZONE SELECT
REPAIR
COMPLETION OF REPAIR
COMPRESSION
COMPRESSION RELEASE
SOFT
SOFT PAUSE
APPEND
DELETE

1 MENU1  2 MENU2  3  4  5  6  7  8  9 SELECT  10

FIG.16

ALL-DATA REPAIR

| WAX → AUTO ASSEMBLY | ZONE ☐ |

| POSITION | HANGER NO. | FRAME NO. | DOMESTIC/ EXPORT | NEW TYPE/ OLD TYPE SECTION | TYPE OF VEHICLE | DERI-VATION | COLOR NAME | MEMO | DESTINATION |
|---|---|---|---|---|---|---|---|---|---|
| 1 | 3201 | | | | | | | | |
| A 2 | 3202 | | | | | | | | |
| F 3 | 3203 | | | | | | | | |
| 4 | 3204 | | | | | | | | |
| 5 | 3255 | | | | | | | | |
| 6 | 3206 | | | | | | | | |
| 7 | 3227 | | | | | | | | |
| 8 | 3248 | | | | | | | | |
| 9 | 3209 | | | | | | | | |
| 10 | 3230 | | | | | | | | |
| 11 | 3231 | | | | | | | | |
| 12 | | | | | | | | | |
| 13 | | | | | | | | | |
| 14 | | | | | | | | | |
| 15 | | | | | | | | | |
| 16 | | | | | | | | | |

SELECT PROCESSING BY FUNCTION KEY

1 ☐MENU  2 ☐  3 ☐  4 ☐  5 ☐COPY  6 ☐  7 ☐  8 ☐  9 ☐SELECT  10 ☐

FIG.17

ALL-DATA REPAIR

WAX → AF    ZONE ☐

| POSITION | HANGER NO. | FRAME NO. | DOMESTIC/ EXPORT | NEW TYPE/ OLD TYPE SECTION | TYPE OF VEHICLE | DERI- VATION | COLOR NAME | MEMO | DESTINATION |
|---|---|---|---|---|---|---|---|---|---|
| 1 A F | 3201 | | | | | | | | |
| 2 | 3202 | | | | | | BLOCK SELECT | | |
| 3 | 3203 | | | | | | ZONE SELECT | | |
| 4 | 3204 | | | | | | REPAIR | | |
| 5 | 3255 | | | | | | COMPLETION OF REPAIR | | |
| 6 | 3206 | | | | | | MONITOR | | |
| 7 | 3227 | | | | | | | | |
| 8 | 3248 | | | | | | | | |
| 9 | 3209 | | | | | | | | |
| 10 | 3230 | | | | | | | | |
| 11 | 3231 | | | | | | | | |
| 12 | | | | | | | | | |
| 13 | | | | | | | | | |
| 14 | | | | | | | | | |
| 15 | | | | | | | | | |
| 16 | | | | | | | | | |

SELECT PROCESSING USING ↑↓ KEYS

1 MENU | 2 | 3 | 4 | 5 COPY | 6 | 7 | 8 | 9 SELECT | 10

FIG. 18

INDIVIDUAL DATA REPAIR CORRESPONDING TO HANGER NO.

| | | |
|---|---|---|
| HANGER NO. | | |
| FRAME NO. | | |
| DOMESTIC/EXPORT SECTION | REPAIR | FLAG 1 |
| NEW TYPE/OLD TYPE SECTION | | 2 |
| TYPE OF VEHICLE | | 3 |
| DERIVATION | | 4 |
| OPTION | | 5 |
| COLOR NAME | | 6 |
| MEMO | | 7 |
| DESTINATION | | |

INPUT HANGER NO. TO BE REFERRED TO

1 [MENU] 2 [ ] 3 [ ] 4 [ ] 5 [COPY] 6 [ ] 7 [ ] 8 [ ] 9 [SELECT] 10 [ ]

FIG.19

INDIVIDUAL DATA REPAIR CORRESPONDING TO HANGER NO.
LOOP ABNORMALITY
1989/05/09 14:55:29

| | | | | | | | |
|---|---|---|---|---|---|---|---|
| | | | | | | | |
| | | | | | | | |

| | REPAIR | | | | | | |
|---|---|---|---|---|---|---|---|

| | FLAG | REPAIR / REPAIR FINISH ⓐ | | | | | |
|---|---|---|---|---|---|---|---|
| HANGER NO. | | 2 | | | | | |
| FRAME NO. | | 3 | | | | | |
| DOMESTIC/EXPORT SECTION | | 4 | | | | | |
| NEW TYPE/OLD TYPE SECTION | | 5 | | | | | |
| TYPE OF VEHICLE | | 6 | | | | | |
| DERIVATION | | 7 | | | | | |
| OPTION | | | | | | | |
| COLOR NAME | | | | | | | |
| MEMO | | | | | | | |
| DESTINATION | | | | | | | |

SELECT PROCESSING BY FUNCTION ↑↓ KEY

1 [MENU] 2 [ ] 3 [ ] 4 [ ] 5 [COPY] 6 [ ] 7 [ ] 8 [ ] 9 [SELECT] 10 [ ]

FIG.20

| NAME | NUMBER OF VEHICLES | | | OPERATIONAL DIRECTION |
|---|---|---|---|---|
| | BASE | PRESENT | RELEASE | |
| ELECTRODEPOSITION NIGHT STRAGE | 15 | 8 | 10 | NORMAL PATH / SRLUNTING PATH |
| SEALER NIGHT STRAGE | 14 | 7 | 8 | NORMAL PATH / SRLUNTING PATH |
| ---- | ---- | ---- | ---- | ---- |

FIG. 21

LINE MONITOR (ALL COLORS)

| COLOR NAME | NUMBER STORED |
|---|---|
| ABC12 | O |
| DEF234 | O |
| GHI456 | O |
| JKL78 | O |
| MNO910 | O |
| PQR012 | O |
| STU34 | O |
| VWX456 | O |
| YZA67 | O |
| BCD789 | O |
| EFG90I | O |
| HIJKO | O |
| KLM123 | O |
| NOP45 | O |
| QRS678 | O |
| TUV98 | O |

1989/03/27  14:50:57

| COLOR NAME | NUMBER STORED |
|---|---|
| WXYI23 | O |
| ZAB456 | O |
| CD78 | O |
| EFG9I0 | O |
| HIJ124 | O |
| KLM433 | O |
| NOP567 | O |
| QRS456 | O |

FIG.22

LINE MONITOR (COLOR BLOCKS)    1989/03/27  14:51:06

PREPROCESSING

| COLOR NAME | NUMBER STORED |
|---|---|
| ABC123 | O |
| DEF456 | O |
| GHI789 | O |
| JKL234 | O |
| MNO567 | O |
| PQR890 | O |
| STU234 | O |
| VWX456 | O |
| YZA567 | O |
| BCD897 | O |
| EFG789 | O |
| HIJ403 | O |
| KLM303 | O |
| NOP345 | O |
| QRS234 | O |
| TUV456 | O |

| COLOR NAME | NUMBER STORED |
|---|---|
| WXY234 | O |
| ZAB567 | O |
| CDE789 | O |
| FGH123 | O |
| IJK456 | O |
| LMN789 | O |
| OPQ123 | O |
| RST456 | O |

FINISH, INTERMEDIATE PAINTING

| COLOR NAME | NUMBER STORED |
|---|---|
| UVW987 | O |
| XYZ654 | O |
| ZYX123 | O |
| WVU456 | O |
| TSR234 | O |
| QPO123 | O |
| NML345 | O |
| KJI456 | O |
| HGF567 | O |
| EDC124 | O |
| BAC345 | O |
| CDE456 | O |
| FGH123 | O |
| IJK234 | O |
| LMN456 | O |
| OPQ123 | O |

PAINTING STOCK AREA

| COLOR NAME | NUMBER STORED |
|---|---|
| RST123 | O |
| UVW456 | O |
| XYZ456 | O |
| MNO123 | O |
| PQR456 | O |
| STU234 | O |
| VWX456 | O |
| YZA123 | O |

FIG.35

FIG.36
INDICATION FOR MOVEMENT TO REPAIR          1989/03/28   16:00:42
HANGER NO. 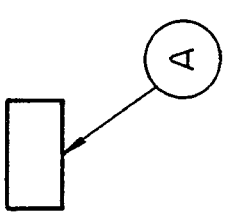

FIG. 37

PROCESS FLOW DISPLAY    F.D 1    1989/07/17   10:38:04

| ADDITION NAME | PRE-SENT | EMP-TY | SPACE | TYPE OF VEHI-CLE | VEHICLE NUMBER | TYPE OF VEHI-CLE | VEHICLE NUMBER | COLOR NAME | VEHICLE NUMBER | COLOR NAME | VEHICLE NUMBER |
|---|---|---|---|---|---|---|---|---|---|---|---|
| F D – 1 | oooooo o | oooooooo | 10 | | oooooo o o oooooooo | | oooooo o o oooooooo | | oooooo o oooooooo | | oooooo o oooooooo |
| F D – 2 | | | 20 | | | | | | | | |
| F D – 3 | | | 30 | | | | | | | | |
| P R – 1 | | | 40 | | | | | | | | |
| P R – 2 | | | 50 | | | | | | | | |
| P R – 3 | | | 60 | | | | | | | | |
| INTERMEDIATE | | | 70 | | | | | | | | |
| PAINTING NIGHT | | | 80 | | | | | | | | |
| FINISH PAINTING | | | | | | | | | | | |
| NIGHT | | | 90 | | | | | | | | |
| SPECIAL PAINTING | | | 100 | | | | | | | | |
| INTERMEDIATE | | | | | | | | | | | |
| SPARE – 1 | | | | | | | | | | | |
| SPARE – 2 | | | | | | | | | | | |
| SPARE – 3 | | | | | | | | | | | |
| SPARE – 4 | | | | | | | | | | | |
| SPARE – 5 | | | | | | | | | | | |
| SPARE – 6 | | | | | | | | | | | |

SYSTEM AND METHOD FOR LINE PRODUCTION MANAGEMENT

FIELD OF THE INVENTION

1. Field of The Invention

This invention relates to systems and a method for line production management system for use in production lines which conduct the body during painting of automobiles, for example.

2. Background Art

In lines which conduct the painting of the bodies of automobiles, conventionally, a plurality of body types are mixed, and furthermore, there are a number of designated painting colors. Accordingly, it is necessary that the operator conduct operations on each body in correspondence with the body type and designated color. An identification card, on which is written a code indicating the body type or designated paint color or the like, is attached to the bodies or conveying hangers moving along the line, and the operator conducts fixed operations by observing these identification cards. Furthermore, in the process which conducts operation by means of robots, the operator knows the vehicle type or designated color by visually observing the identification card and after this, inputs operational directions to the robots from the control keyboard and the like.

However, in conventional painting lines using identification cards, it is impossible to obtain a concentrated overview of the number of a certain body types in a certain process or the process which a certain inputted body was undergoing at a certain time, so that management of operations was difficult. For example, in the case in which the number of bodies in a certain process in a painting line was extremely small and some breakdown occurred in this process, it was impossible to obtain a quick grasp of the situation in the conventional painting line. And, in conventional painting lines using identification cards, there were cases in which mistaken operational directions were inputted as a result of a misreading or a mistake in operation by operator, and as a result of this, defective units were created.

Moreover, in the operations of painting, there is a necessity to be certain whether the preparation of a fixed color is finished or not; however, in conventional systems, it was not possible to know in advance when this color would enter the painting process, and so appropriate verification processing was difficult. In the case in which a breakdown occurred in the painting apparatus of a certain color, it is desirable to temporarily halt the painting of that color and to conduct instead the painting of a different color; however, in conventional systems, it was difficult to select a different color and transfer this to the painting process. Furthermore, a plurality of mixing tanks are provided for each painting booth, however, as a number of bodies are conveyed randomly to the painting booth, it is necessary to conduct the painting of many tens of color types in this painting booth. Accordingly, conventionally, in order to make it possible for the painting booth to conduct the painting of any color at any time, temperature adjustment was continually conducted on all mixing tanks. As a result, an extremely large amount of energy was necessary for the adjustment of the paint temperature.

By the way, in the fixed process, the maximum number of bodies which can be inputted into the process (hereinafter referred to as a full-finish number) is determined in advance. Accordingly, when a situation occurs in which the full-finish number is exceeded as a result of some cause, there is a necessity to temporarily retain the bodies before this process. Furthermore, in the conveying line of the bodies there is a part in which it is necessary to create openings for a portion of the number of vehicles at the time of the stopping of operation. In this type of case, in order to create these openings on the line, a part which removes and retains the bodies is necessary.

In this type of part, a night storage is provided for the retaining of the bodies. In addition, it is possible to transfer bodies from the main line to night storage by means of switching the hangers which transport the bodies or the rails for the vehicles by means of a fixed switching apparatus.

Conventionally, the operator conducted switching operations to night storage while viewing the state of the operations, so that it was necessary to place an operator at each switching part, and thus many workers were necessary. Furthermore, in the case in which the number of operators were small, each night storage had to be conducted, so that the operations become complex. Furthermore, as it was impossible to manage the timing at which the input of the bodies into night storage and the output of the bodies from night storage occurred in a concentrated fashion, it was necessary to manage each night storage separately.

Additionally, in lines which conduct the painting of automobile bodies, the bodies are conveyed by carriages or hangers, and it is common to conduct various types of operations while the bodies are disposed on carriages or the like. In this case, if there are abnormalities in the carriages or the like, defective units are created, so that when such abnormalities are discovered, it is necessary to directly take measures such as repair or the like. Conventionally, the detection of abnormalities and the repair processing of abnormal carriages was all done by human labor. However, with the human labor method, abnormalities were sometimes overlooked and the repair processing was complex.

SUMMARY OF THE INVENTION

The present invention was created in view of the above situation. The present invention has as an object thereof to provide a production management system which enables a concentrated overview of information such as the position of an item to be processed in the production line or the level of the number of bodies in each process, or the like, and which, by means of this, enables the management of production speed, or the like, and also enables a quick response to irregularities or breakdowns.

To achieve the above object, the production management system of the present invention includes a plurality of conveying means for conveying items to be processed which are placed in an input part to a sending another part; identification codes attached to each of said conveying means; reading means for reading the identification codes of the conveying means in said input part; input means for inputting data related to items to be processed which are placed in the input part, memory means for storing identification codes read by said reading means and data inputted by said input means as a set each time an item to be processed is placed in said conveying means; and a register means which has a plurality of memory areas connected in a consecutive manner, inputs identification codes read by said reading means into an initial step memory area, successively shifts the inputted identification codes in the direction of the final step memory area, provided there are empty memory areas, and discharges the identification code of a conveying means from a final memory area when an item to be processed is sent from said conveying means in said sending part.

Information code of conveying means, on which items to be processed are placed and the data of the same item to be processed are stored as a set in memory means, and furthermore, the information code inputted into register means undergoes tracking corresponding to the conveyance of the item to be processed. Accordingly, by means of referring to identification code in register means i and the contents of the memory of memory means, it is possible to know the data relating to an item to be processed and the position thereof.

In accordance with the present invention, it is possible to gain a concentrated overview of data relating to, for example, the position of an item to be processed along a production line or the level of the flow numbers of bodies in each process thereof, and by means of this, it is possible to rapidly conduct the management of the production speed, the detection of abnormalities or countermeasures against breakdowns.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 1A and 1B are an outline structural diagram showing the structure of a painting line which is an example of the present invention.

FIG. 9 is a top view showing the structure of a switching apparatus for switching the conveying lines of the hangers.

FIG. 10A and 10B are a block diagram showing the structure of computer 64.

FIG. 11–37 are front views showing display examples in the present example.

DETAILED DESCRIPTION OF THE PREFERRED EMBODIMENTS

Following below, the preferred embodiment of the present invention will be explained in reference to the diagrams.

Figure 1A:
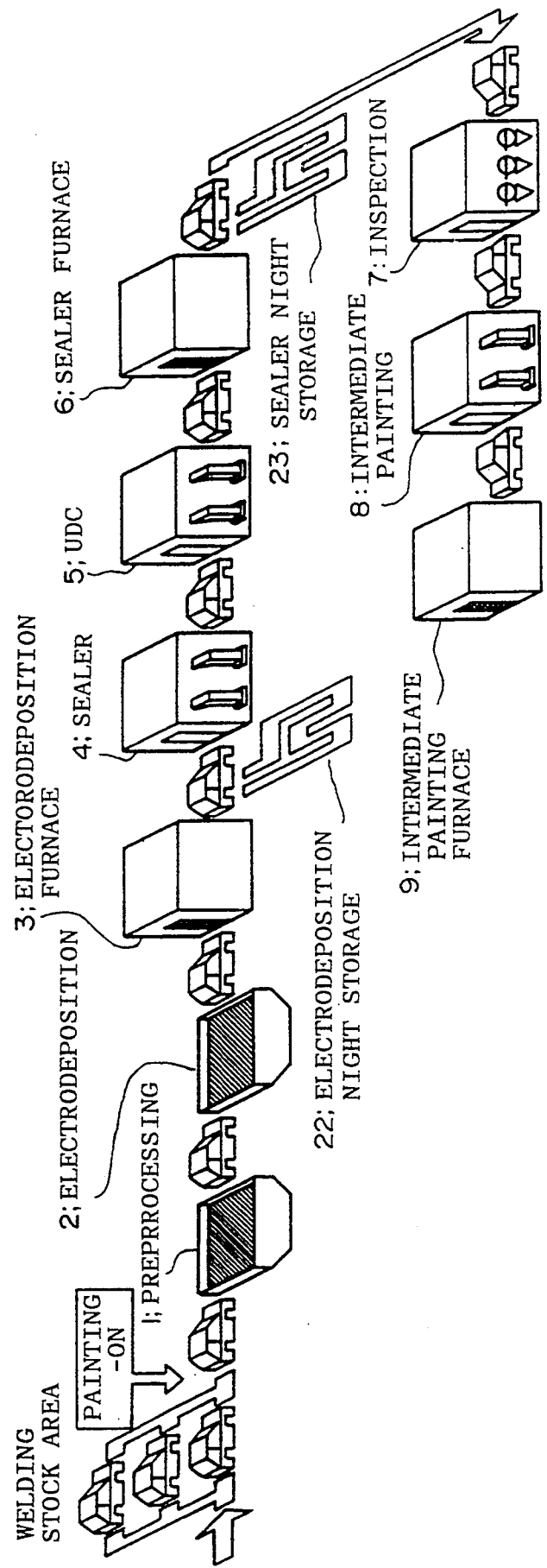

A: The structure of the preferred embodiment (1) Outline of the production line in the embodiment FIG. 1A and 1B are an outline structural diagram showing a painting line in the embodiment of the present invention. This line conveys items to be processed (automobile bodies) which are placed on hangers in an input part along a sending part in an order which is determined through the medium of a plurality of stations which are disposed along the conveyance path. An explanation of the processes (stations) of this painting line is given below.

After body B is temporarily stored in a welding stock area, it is placed on a hanger conveyer (see FIG. 3) and conveyed to preprocessing part 1. Here, when preprocessing is conducted, electrodeposition coating is conducted by means of the processes of electrodeposition part 2 and electrodeposition furnace 3. Next, in sealer 4, seal processing is carried out on the seam parts of the steel plates, and in undercoater part 5, processing is conducted on the lower part of the floor. Then, inspection part 7 is reached through sealer furnace 6, and here, inspection of the electrodeposition coating is carried out. When inspection part 7 has been passed, intermediate painting processing is carried out by means of intermediate painting part 8 and central painting furnace 9. After central painting processing, inspection part 11 is reached through color-arranged row storage 10, and inspection of the intermediate painting is carried out. Next, in finish painting part 12, the painting of the designated color is carried out. Then baking is conducted in finish painting furnace 14 and by means of this, the finish painting processing is completed. A body B on which the finish painting has been completed undergoes various inspections in inspection part 15, and reaches wax processing part 19 through painting stock area 18, and here wax is applied. The body which has been wax processed is sent to painting stock area 20. In painting stock areas 18 and 20, reordering is conducted to enable the efficient sending of bodies B to the following processes (the automobile assembly line). In the automobile assembly processes, the operation of each process differs depending on the type of automobile, the destination, or the type of options, so that a highly efficient ordering of the bodies moving along the line is required. In painting stock areas 18 and 20, reordering is conducted in accordance with this demand. The reason that reordering operations are conducted at the two painting stock areas 18 and 20 is that it is impossible to conduct sufficient reordering in one place. The bodies B sent from painting stock area 20 are held temporarily in automobile assembly stock area 21 and are then moved to automobile assembly processing. Automatic assembly stock area 21 is capable of storing roughly 100 bodies and serves as a buffer for bodies to be sent. As a result of having this type of buffer function, it is possible to save item-procurement time in the automobile assembly process and to adjust to changes in the processing amounts in the automobile assembly process.

Furthermore, the electrodeposition night storage 22, sealer night storage 23, intermediate painting night storage 24, and finish painting night storage 25 are rails with a structure such that bodies cycle around them, and are used at night, and the like. In the painting process, when the bodies congest at one point for a long period of time, flawed products result, so that there is generally a need to continually move the bodies. During times such as night when the regular line is stopped, the conveyance of the bodies is switched from the standard line to the above-described night storages 22–25 and the bodies then cycle about these same night storages.

(2) Structure of the control system

Figure 2A:
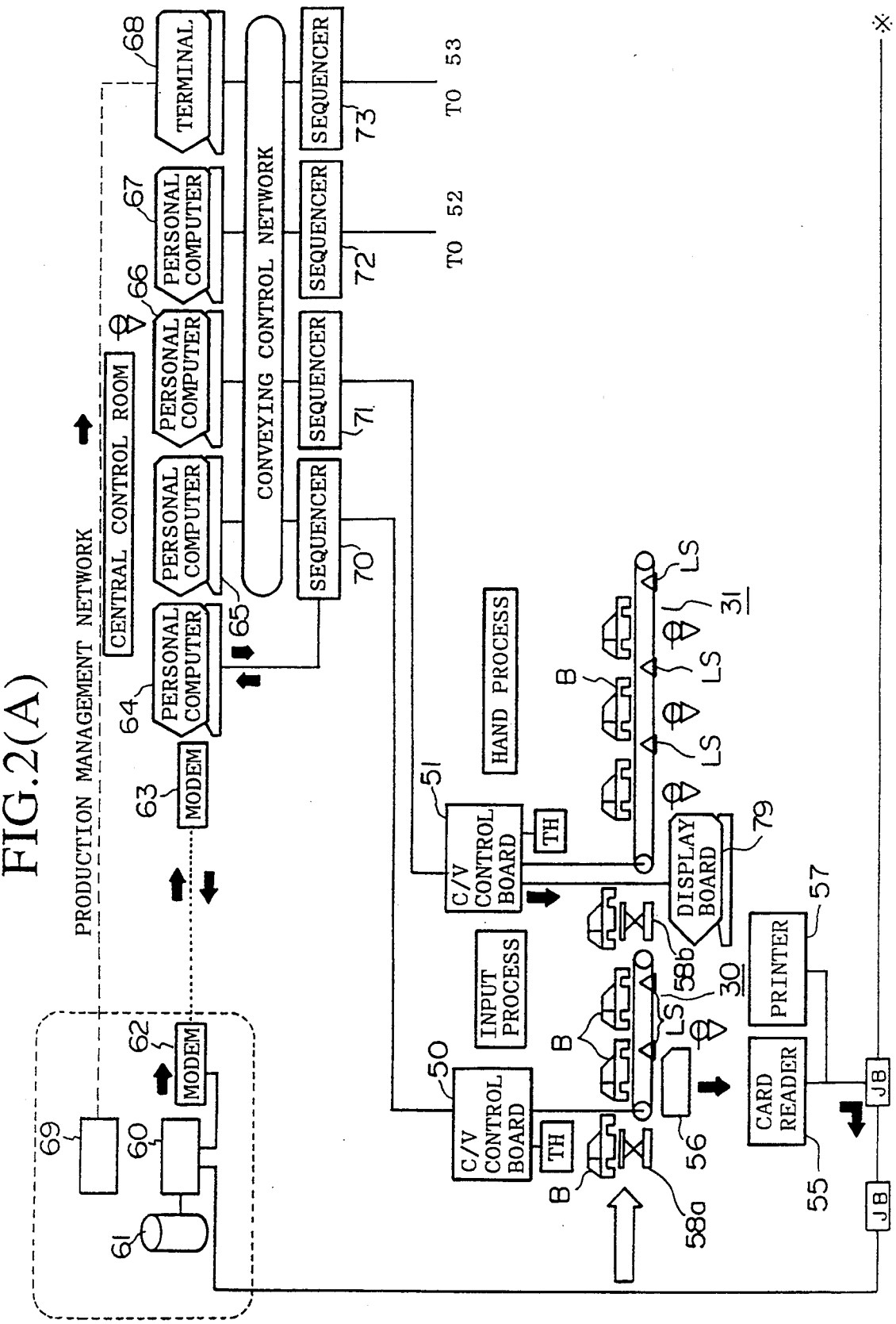
FIG. 2A and 2B are a control block diagram showing the control system of the same example.
Figure 2B:
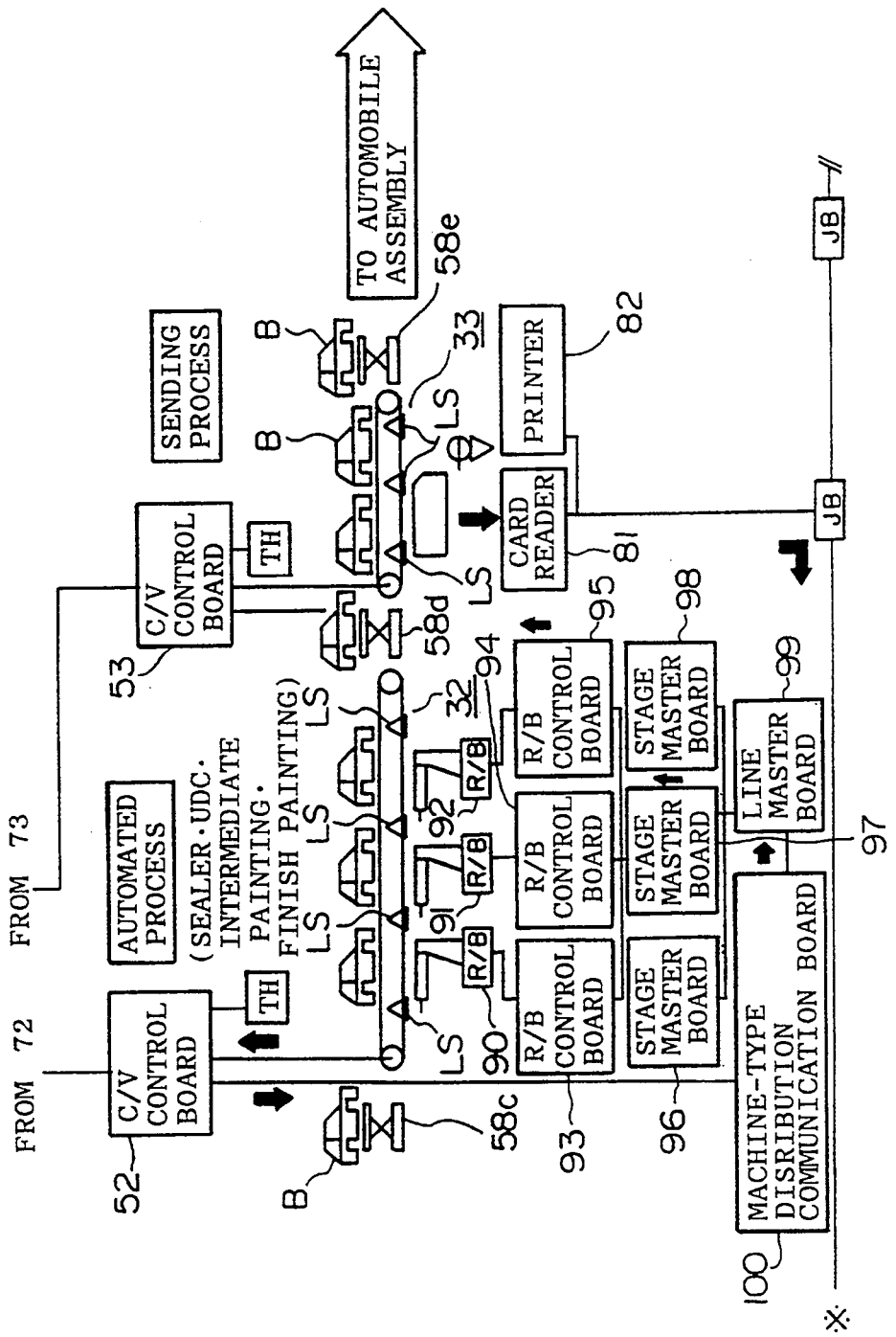

FIG. 2A and 2B are a block diagram showing the control system of this embodiment. In the diagram, 30, 31, 32, and 33 are hanger conveyors which convey bodies B. The hanger conveyors are provided at the input processes, hand processes, automated processes and the sending process, respectively. By the input processes are meant the processes from the "T1-ON" shown in FIG. 2A up to preprocessing part 1. By the hand processes are meant inspection parts 7, 11, and 15. By the automatized processes are meant sealer 4, undercoater 5, intermediate painting part 8, finish painting part 12 and wax processing part 19. By the sending process is meant painting stock area 20. In FIG. 2A and 2B, for the purposes of simplicity of the explanation, the input processes, hand processes, automatization processes and the sending process are simply arranged serially. However, in actuality, the hand processes and the automated processes may be arranged alternately where required.

Figure 3:
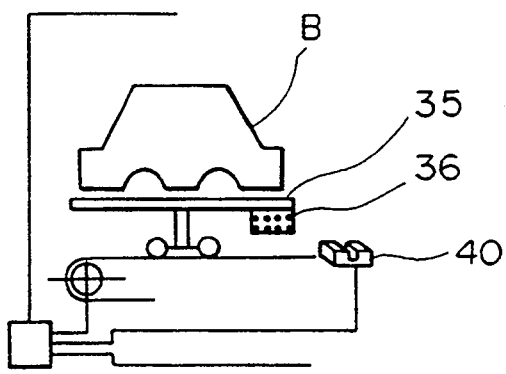
FIG. 3 is an outline structural diagram showing the region of the input part of a hanger conveyer.

A number of the hangers 35 shown in FIG. 3 are attached to each hanger conveyor 30–33. Hangers 35 cycle on each hanger conveyor 30–33. In actuality, hangers 35 hang from hanger conveyers 30–33. However, for the purposes of simplicity, a structure will be used in which the hangers are placed on hanger conveyers 30–33.

Figure 4:
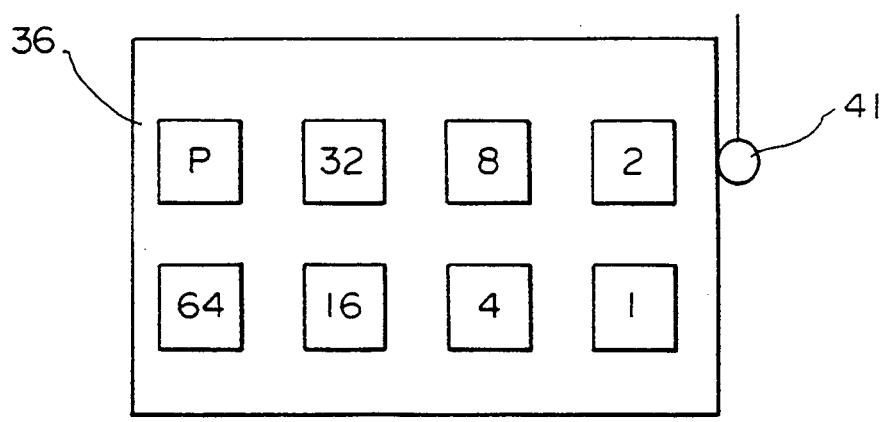
FIG. 4 is a front view showing the structure of the hanger plate.

Hunger plates 36 are attached to hangers 35, and eight window parts are set in hanger plates 36, as shown in FIG. 4. Weights such as "1", "2", "4", "8", . . . are assigned to these eight window parts and a fixed identification code (hereinbelow termed a hanger number) is shown, depending on whether these window parts are opened or closed. As these hanger numbers are characteristic for each hanger, no two will be set to the same value. The hanger numbers are read by the hanger reader 40 shown in FIG. 3. Hanger readers 40 are provided at the input part and fixed positions (described hereinafter) of each hanger conveyor 30; they detect the lead end of hanger plate 36 by means of photocell 41, as shown in FIG. 4, and the open or closed state of each window part is detected at this timing. The motion of the hanger conveyers 30, 31, 32, and 33 shown in FIG. 2A and 2B are controlled by the conveyer control boards 50, 51, 52, and 53, respectively. In the input process, a card reader 55 is provided; it reads the data on magnetic cards 56. The various types of data (hereinafter termed body data) relating to the painting and assembly of body B are stored on magnetic cards 56; these magnetic cards 56 are conveyed along with bodies B in the painting process. Printer 57 prints out the body data read by card reader 55 so that a visual check can be made by the operator. Reference numeral 58a indicates a transfer apparatus in which the bodies are disposed on hangers 35 of hanger conveyors 30; when bodies are carried by this transfer apparatus 58a, the magnetic card 56 is inserted into card reader 55 by the operator. Reference numerals 58b14 58d indicate transfer apparatuses which conduct the transfer of the bodies between hanger conveyers; reference numeral 58e indicates a transfer apparatus which conducts the transfer of bodies to the following process.

Furthermore, overload detectors TH which use thermorelays are provided in the vicinity of the drive motors of each hanger conveyer 30, 31, 32, and 33. These overload detectors TH output an overload detection signal when the temperature of the drive motors exceeds a fixed value.

The body data read by the above-mentioned card reader 55 are transmitted to host computer 60. Reference numeral 61 indicates a file which stores the use data and processing data and the like of the host computer 60. Furthermore, host computer 60 is in communication with computer (personal computer) 64 through the medium of modems 62 and 63. Computer 64 conducts data communication with sequencer 70, and furthermore, sequencer 70 conducts data communication with sequencer 71, sequencer 71 conducts communications with sequencer 72, and sequencer 72 conducts data communications with sequencer 73.

Reference numerals 65–67 shown in FIG. 2A indicate computers which comprise sequencers 70–73 and LANs (Local Area Networks). One of the computers 65–67 serves as a backup to sequencer 70–73; it contains identical data.

Figures 5, 6:
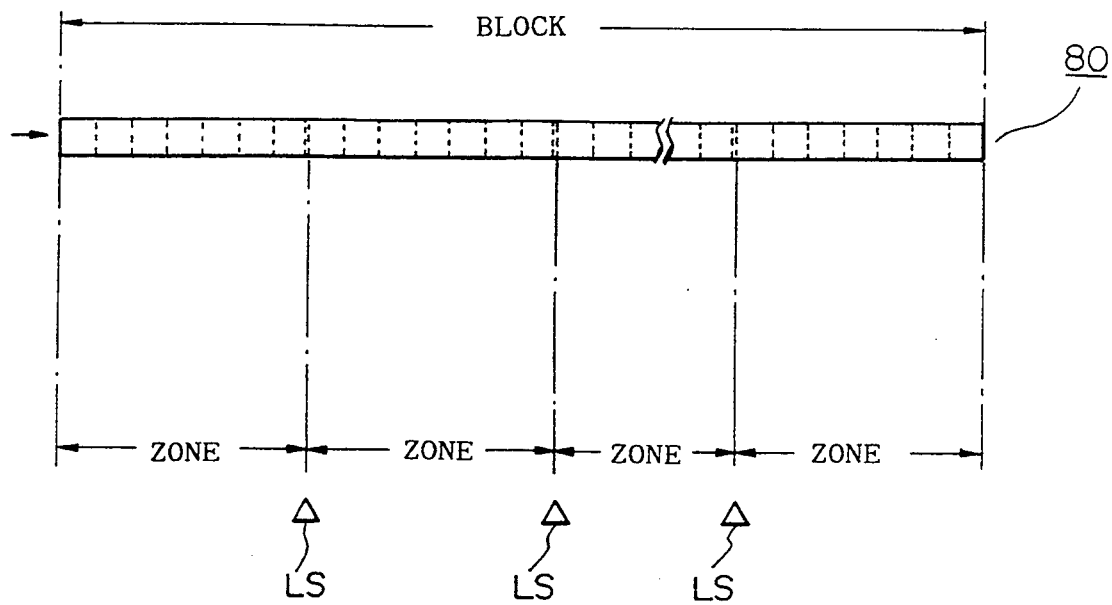
FIG. 5 is a concept diagram showing a shift register which is provided in a sequencer.
FIG. 6 is a memory map showing the memory contents of memory M of computer 64.

Sequencers 70–73 conduct the sending and receiving of data to and from conveyer control boards 50–53, and furthermore, the sequencers have shift registers 80, as shown in FIG. 5 The hanger number read by hanger reader 40 in the input part of each hanger conveyer 30–33 is inputted into the initial step of shift register 80.

Furthermore, in hanger conveyers 30–33, limit switches LS which detect the passage of hangers 35 are provided at fixed intervals, and the memory area of shift register 80 is divided into sections corresponding to these limit switches LS (see FIG. 5). In this case, sequencers 70–73 are such that the sections marked off by means of the limit switches can be thought of as zones, the whole section of the shift register 80 can be thought of as a clock, and in addition, the position of each memory area of shift register 80 can be thought of as a particular position. Shift register 80 is a forward-loading type register; when a hanger number is supplied to the initial step thereof, this number is successively shifted in the direction of the later steps, provided there are empty areas. A shift which goes beyond a zone is only carried out in the case in which the passage of a hanger 35 has been detected by means of a limit switch LS. In other words, when the passage of a hanger is detected by a limit switch LS, the hanger number in the memory area of the final step of the zone preceding the boundary corresponding to the limit switch LS in question is shifted into the memory area of the initial step of the following zone (a detailed description of this operation is given hereinafter).

The reference numeral 79 shown in FIG. 2A indicates a display board which conducts various types of displays under the control of conveyer control board 51 for the operator who operates the hand process. Reference numerals 81 and 82 indicate a card reader and a printer respectively. They have the same functions as the above-mentioned card reader 55 and printer 57. The body data read by card reader 81 are transmitted to the automobile assembly line which constitutes the following process. This is because the items that must be prepared in the automobile assembly line differ depending on the type of bodies, so that it is necessary to know in advance which types of bodies are involved and in what order they will proceed.

Next, reference numerals 90, 91, and 92 indicate robots which conduct various types of automatic operations in the automated processes; these robots are controlled by means of control boards 93, 94, and 95. Stage master board 96 transmits the appropriate job number and paint color number (in the case of a painting robot) to the robot control boards 93, 94, and 95. Here, the Job number is a code which indicates the operation of robots 90, 91, and 92, while the paint color number is a code which indicates the paint which the painting robot is to apply. Furthermore, stage master boards 96 and 98 transmit job numbers and the like to robot control boards (not shown in diagrams) of other stages. The job numbers and paint numbers are transmitted from machine type communication distribution board 100 to line master board 99; line master board 99 distributes these numbers to stage master boards 96–98. When machine type communication distribution board 100 receives body data from conveyer control board 52, it refers to an interior table, converts this data into job numbers and paint numbers, and transmits these to line master board 99. Operations before the output of body data from conveyer control board 52 will be discussed hereinafter.

In the above structure, sequencers 70–73, personal computers 64–67, and terminal 68 are disposed together in a central control room. Furthermore, terminal 68 displays management data relating to production process flow and the like which is transmitted from management computer 67.

Here, the structure of the rail switching apparatus which switches hanger conveyers 30 from a main line to night storages 22–25 or repair line will be explained. This switching to a repair line is conducted in cases in which abnormalities have been generated in a hanger.

FIG. 9 is a top view showing the structure of the rail switching apparatus. The reference numeral 120 shown in the diagram indicates a main line, and reference numeral 121 indicates a trolley. Two trolleys 121 are provided with a fixed spacing in the forward and backward direction of the line with respect to each hanger 35, and hanger 35 hangs from these trolleys. Reference numeral 122 indicates a diverging plate; it is freely rotatable about support point A and is normally in the position indicated by the solid lines in the diagram. In the case in which diverging plate 122 is in the position indicated by the solid lines, trolleys 121 are conveyed by the conveyers of the main line from the right end in the diagram to the left end. Next, reference numeral 123 indicates a diverging cylinder; the cylinder is retracted at the time of divergence. A proximity sensor SE1 which detects whether the rod is extended or not, and an on/off detector which detects the on/off state of the electromagnetic valve which serves to extend and retract the rod, are provided at the diverging cylinder 123.

When the diverging cylinder 123 is retracted, the driving force thereof is communicated to diverging plate 122 through the medium of member 122a; diverging plate 122 rotates in a counterclockwise direction and reaches the position indicated by the dotted lines. As a result, trolleys 121 are guided by diverging plate 122 and enter a night storage (or a repair line) 125. At this time, the dog 126 provided on a trolley 121 engages the actuator of the limit switch 127 which is provided at the input side of night line (or repair line) 125. By means of the on/off state of this limit switch 127, it is detected whether a trolley 121 has entered the night line (or the repair line). Reference number 130 indicates a cylinder; the cylinder rod thereof has a catch 132 at the lead end thereof. This cylinder 130 extends the cylinder rod thereof when a trolley 121 enters night line 125 and engages dog 126 with catch 132; thereinafter, the cylinder rod is retracted and trolley 121 is transferred onto night line conveyer (or repair line conveyer) 131. A trolley 121 which has been transferred to night line conveyer (or repair line conveyer) 131 is thereinafter conveyed by the night line conveyer (or the repair line conveyer) 131. In FIG. 9, a hanger reader 40 is provided at the position indicated by the dotted lines; it reads the hanger numbers of the hangers 35 which enter.

Furthermore, in the case in which a hanger 35 is transferred from night storage (or repair line) to the main line, the same type of apparatus as that described above, is used. In this case, the operational order thereof is the opposite of the above.

Figure 10B:
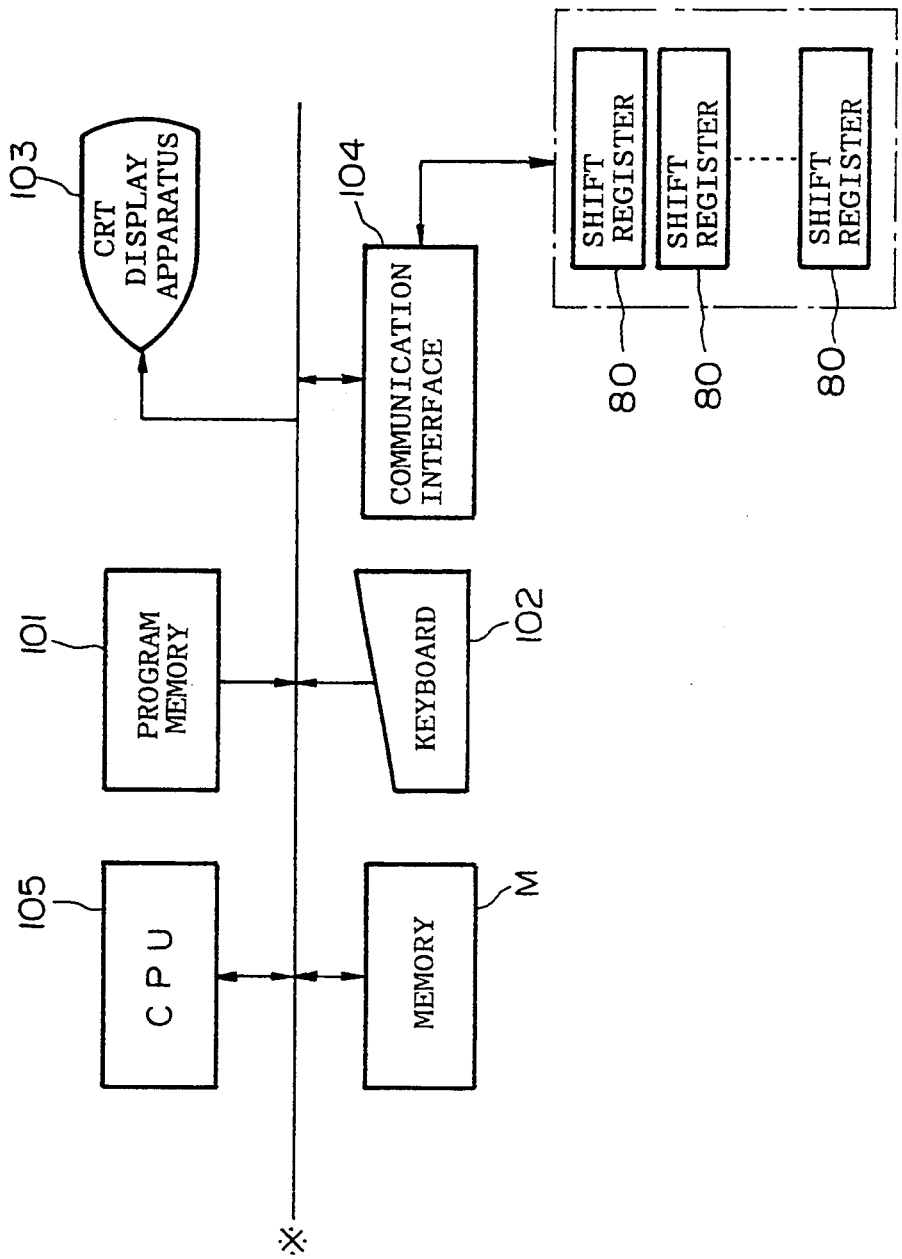

Next, the interior structure of computer 64 will be explained with reference to FIG. 10A and 10B.

In the diagram, reference numeral 105 indicates a CPU which controls each part of the apparatus; it operates in accordance with programs within program memory 101. Reference M indicates a memory which stores hanger numbers and body data; the operational process thereof will be explained hereinafter. Reference numeral 102 indicates a keyboard with conducts various types of directives with respect to CPU 105; reference numeral 103 indicates a CRT apparatus which conducts various types of displays under the control of CPU 105. Reference numeral 104 indicates a communication interface; it controls communications among sequencers 70–73, computers 65–67 and CPU 100. CPU 100 conducts writing and reading with respect to each shift register 80 within sequencers 70–73 through the medium of communication interface 104.

Furthermore, the output signals of the hanger readers 40 and limit switches 127 shown in FIG. 9 are supplied to CPU 105. CPU 105 controls the extension and retraction of cylinder 130 and diverging cylinder 123. Groups U, which comprise hanger reader 40, limit switch 127, cylinder 130 and diverging cylinder 123 and are surrounded by dotted lines in FIG. 10, are provided at the input and output sides of each night storage (or repair line). Furthermore, the other computers 65, 66, and 67 have a structure identical to that of the above.

B: Operation of the Embodiment

Next, the operation of the example with the above described structure will be explained.
(1) Tracking of the hanger numbers First, from the welding stock area shown in FIG. 1A and 1B, the bodies are placed on the hangers 35 of the input part of hanger conveyer 30 by means of transfer apparatus 58a. At this time, the operator inserts the magnetic card 56 of the same body into card reader 55. As a result, the body data are transmitted to host computer 60 and furthermore, are transmitted to computer 64 through the medium of modems 62 and 63. Hanger reader 40 (see FIG. 3), which is provided at the input part of hanger conveyer 30, reads the hanger number from hanger plate 36 and transmits this number to sequencer 70. Sequencer 70 writes the transmitted hanger number into the initial step memory area of the initial zone of register 80 and also transmits this number to computer 64. When the hanger number is supplied to computer 64, it stores this in its interior memory as a set together with the body data. As a result, the relationship of the body and the hanger on which it is disposed is maintained as data. Thereafter, the above process is conducted each time a body B is placed on a hanger 35 by means of transfer apparatus 58a, and by means of this, the corresponding relationship of the inputted bodies and hanger numbers is stored in the internal memory of computer 64. Here, a case will be used as an example in which the hanger numbers read by the hanger reader 40 are (1), (2), (3) . . . and the internal memory of computer 64 stores the corresponding relationships shown in FIG. 6. In the diagram, reference M indicates the internal memory while references A1, A2 . . . indicate memory areas thereof. For example, body data indicating a domestic body automobile type A and red color are stored in memory area A1 and the hanger number (1) on the hanger on which this body is disposed is also stored.

Figure 7:
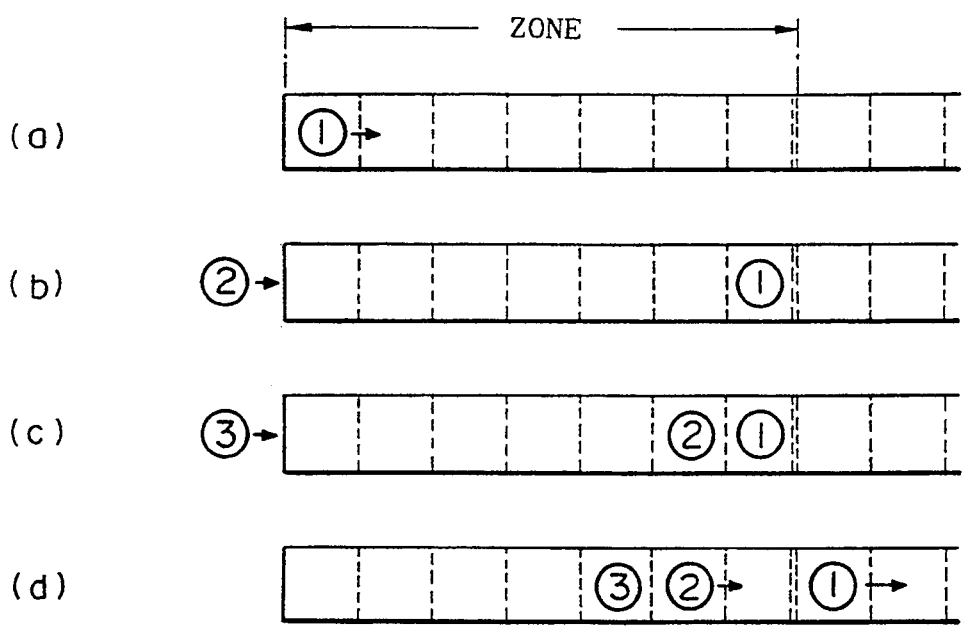
FIG. 7 is an explanatory diagram which explains the shift operation of shift register 80.

Shift register 80 within sequencer 70 conducts the following processing. Initially, as shown in FIG. 7(a), hanger number (1) is inputted into the initial step memory area. This hanger number (1) is successively shifted to the following steps and reaches the final step of a zone (see FIG. 7 (b)). Next, when hanger number (2) is inputted, this is shifted to the following steps as above and is stored in the memory area which is one position before the final step of the zone (see FIG. 7(c)). In this way, the hanger numbers inputted into shift register 80 are successively shifted to following steps, provided there are empty areas. In the above case, shifts which will go past a zone are not carried out. The hanger 35 with the number (1) is moved, and when the passage thereof is detected by the first limit switches LS, the detection signal of this limit switch LS is sent to sequencer 70. By means of this, sequencer 70 shifts hanger number (1) to the memory area of the initial step of the following zone as shown in FIG. 7(d). Then the hanger number (1) which has been shifted in this manner is successively shifted to the following steps in the following zone. Furthermore, in the previous zone, as the final step memory area is empty, hanger numbers (2), (3) . . . are shifted by one step.

The case in which the conveyance of body B continues and this body is transferred from hanger conveyer 30 to hanger conveyer 31 will be explained. For example, when the hanger with hanger number (1) reaches the sending part of the hanger conveyer 30, the body is transferred on transfer apparatus 58b. At this time, hanger number (1) is contained in the final step memory area of shift register 80. However, as a result of the transfer of body B, shift register 80 nullifies hanger number (1). Accordingly, each hanger number in shift register 80 is shifted one step in the direction of the later steps.

Furthermore, an identification number is set in advance in transfer apparatus 58b and this identification number is stored in sequencer 70 or computer 64. When body B is transferred, a signal indicating the transfer is supplied to computer 64 through the medium of sequencer 70, and by means of this, computer 64 replaces the hanger number in the memory area A1 shown in FIG. 6 with the identification code of the transfer apparatus 58b. For example, if the identification number is taken to be (100), (100) is written in place of (1).

Next, body B is placed on a hanger in the input part of the hanger conveyer 31 from transfer apparatus 58b.

Then the hanger number of this hanger 35 is detected by means of hanger reader 40 in the input part of hanger conveyer 31, and is sent to sequencer 71. If it is assumed that hanger number (18) is detected, this hanger number (18) will be transmitted to sequencer 71. Sequencer 71 transmits hanger number (18) to computer 64 through the medium of sequencer 70, and inputs it into its internal shift register 80. As a result, computer 64 replaces the hanger number "100" of the memory area A1, shown in FIG. 6, with (18). Furthermore, the shift register 80 in shift register 71 conducts shift operations which are identical to those of the shift register 80 of the sequencer 70 described above.

The above operations are conducted in the same manner in the case in which body B is transferred to another hanger conveyer. That is, when the hanger on which the body is disposed changes, computer 64 substitutes a new value for the hanger number in the corresponding memory area of memory M. Accordingly, by referring to memory M, it is possible to know which type of body is disposed on each hanger.

(2) Observation of Tracking Data

In the above manner, each shift register 80 within sequencer 70-73 shifts hanger numbers in correspondence with the movement of the hangers. That is, it conducts the tracking of the hanger numbers. The sequencers 70-73 transmit the contents of shift register 80 to computers 65-67 at the timing in which body B is transferred to a downstream side hanger conveyer. This transmission is conducted with respect to at least one of the computers 65-67 and by means of this, the hanger number (tracking data) within each shift register 80 is maintained in a duplicated manner. In the case in which one of the sequencers 70-73 goes down, hanger number data are transmitted from one of the computers 65-67 to the shift register 80 of the sequencer. By means of this, recovery can be conducted quickly.

Furthermore, computer 64 conducts the following processing with respect to all bodies B which are placed in the painting line.

I. By referring to the body data within memory M, a display of the number of the vehicles is conducted. This display can be conducted by block units. This is because it is possible to determine which block a body belongs to from the hanger number in memory M.

II. In the same way as above, by referring to the body data, body data processing, for example, discrimination by vehicle type, discrimination by destination, or discrimination by derivation or the like can be conducted.

III. By checking the movement of hanger numbers within sequencer 80, it is possible to gain an overview of the flow numbers of bodies B and to display these numbers in real time. Furthermore, the flow numbers of body b can be dealt with in terms of block units or zone units, so that it is possible to detect the occurrence of obstructions from the increase in these numbers. In the case in which detection of obstructions is conducted automatically, the upper and lower threshold flow numbers, which are the basis thereof, are set, and in the case in which the measured flow number crosses a threshold value, it is preferable to conduct an alarm display.

Furthermore, when an overview is gained of the flow numbers, the rhythm (Takt) (number produced in a unit hour) can be easily controlled. Rhythm can be controlled by means of the number of rotations of the drive motor of the hanger conveyer, so that a desired rhythm can be established while monitoring the flow number. By means of this, for example, in the case in which the rhythm of the automobile assembly, which is the following process, declines for some reason, the rhythm of the painting line can be correspondingly reduced and it is possible to adjust accordingly.

IV. By means of referring to the contents of each shift register 80 and the contents of memory M, it is possible to know the block or zone containing a certain body. Furthermore, computer 64 and computers 65–67 are able to conduct the sending and receiving of data through the medium of LANs and sequencers 70–73, so that the above processing can be conducted in computers 65–67 when necessary.

As explained above, in accordance with the present invention, it is possible to gain a concentrated overview of data relating to, for example, the position of an item to be processed along a production line or the level of the flow numbers of bodies in each process thereof, and by means of this, it is possible to rapidly conduct the management of the production speed, the detection of abnormalities or countermeasures against breakdowns.

(3) Automated Processing by Robots

Figure 8:
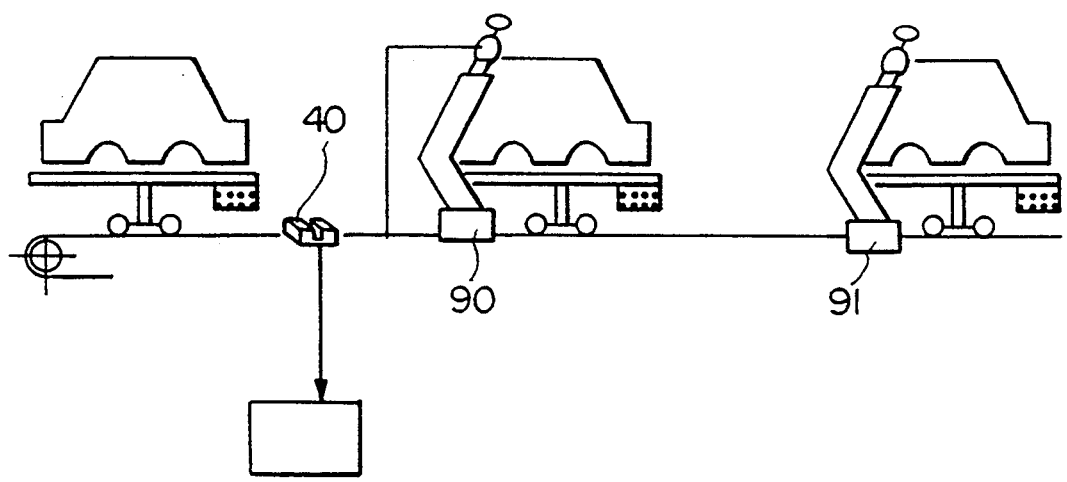
FIG. 8 is an outline structural diagram showing the structure of the region around robot 90.

A hanger reader 40 is provided before robots 90 as shown in FIG. 8; it reads the hanger numbers of the passing hangers 35. The hanger numbers thus read are transmitted to conveyer control board 52, and furthermore, are transmitted to sequencer 72. Sequencer 72 compares the transmitted hanger number with the hanger number in shift register 80. The memory areas of shift register 80 correspond to the positions on the hanger conveyer, so that the memory area corresponding to the hanger reader 40, shown in FIG. 8, can be specified. When this memory area is made a specified area and the tracking of the hanger numbers and conveyance of the actual hanger is conducted normally, the hanger numbers transmitted to sequencer 72 and the hanger numbers shifted into the specified area should be in agreement. In sequencer 72, detection of agreement or nonagreement is made; in the case of nonagreement, a message indicating this is sent to control board 52. The message supplied to control board 52 is supplied to robot control board 93 through the medium of machine type communication distribution board 100, line master board 99 and stage master board 97; here, a display indicating nonagreement is conducted. When there is nonagreement, there has been some sort of irregularity, so that the operator conducts recovery processing.

In sequencer 72, in the case in which agreement has been detected, the supplied hanger number is transmitted to computer 64, and computer 64 refers to the body data from memory M corresponding to the hanger number. Then, the body data which were referred to are transmitted to machine type communication distribution board 100 through the medium of sequencer 72 and conveyer control board 52. In machine type communication distribution board 100, the Job number and paint color number corresponding to the transmitted body data are found with reference to a table. This job number is supplied to robot control board 93 through the successive medium of line master board 99 and stage master board 97. As a result, the robot control board controls robot 90 in correspondence with the Job number and paint color number (in the case of a painting robot). By means of this, processing is carried out automatically on the inputted bodies B. In addition, operations are determined for the robots 91 and 92 which are positioned after the robot 90 by means of the transmission of job numbers and paint color numbers distributed in the above manner to robot control boards 94 and 97.

As explained above, in accordance with the present invention, accurate operational direction can be continually conducted with respect to robots without the input of mistaken operational directions resulting from misreading or operational mistakes of the operator. Accordingly, it is possible to increase the rate of acceptable units and to eliminate the production of defective units.

(4) Display/correction of the hanger numbers and the like

Next, the display/correction operations of the hanger numbers and body data will be explained with respect to each mode. Among the modes, there is a whole data correction mode in which a summary of the hanger numbers and all the displayed data are corrected where necessary, a hanger number correspondence correction mode in which the body data corresponding to hanger numbers are displayed and these body data in particular are corrected, and a point shift correction mode in which the amendment, erasure, or movement of hanger numbers corresponding to positions are conducted.

I: Point Shift Correction Mode

When the apparatus is switched on, the whole data correction mode is set by the initializing processing and the display shown in FIG. 11 is conducted in CRT display apparatus 103. In the lower part of the screen shown in the diagram, the functions of the function keys are displayed. Here, when the function key f.1 of keyboard 102 is pressed, as shown in FIG. 11, a menu display appears in the part A. When function key f.1 is pressed again in this state, the original screen is restored. In the screen shown in FIG. 11, one of the entries in the menu is displayed in a highlighted form and by pressing the cursor keys ↑ and ↓ it is possible to change the position of the highlighter. When "point shift correction" is highlighted by means of this operation, and the execution key (not shown in the diagram) is pressed, the point shift correction mode begins and the screen display is as shown in FIG. 12. This screen shows an example of a case in which zone 9 has been selected (see the upper part of the screen). Furthermore, the POS shown in FIG. 12 indicates position numbers while HNO indicates hanger numbers. To give one example, the hanger number corresponding to position 1 is 3040, while the hanger number corresponding to position 2 is 3014. Here, the position numbers are numbers 1, 2, 3 . . . which proceed successively from the final-step of each zone of a shift register in the direction of the initial-step thereof. The screen display shown in FIG. 12 is conducted by means of the reading of the hanger numbers of the zone within shift register 80 which is selected by CPU 105 and by the transmission of this to CRT display apparatus 103. Accordingly, the displayed hanger numbers are successively scrolled in accordance with this tracking. Next, when function key f.9 is pressed, a summary of the processing is displayed in part A of FIG. 13. In this summary, one of the items is highlighted as in the above case, and by the selection of one of these by means of the cursor key and the pressing of the execution key, transfer is made to the processing of the indicated item. For example, when "block select" is selected, the name of the block is displayed in part A of FIG. 14. Among block names, for example, there are such names as "preprocessing", "sealer" and "UDC (undercoating)". Here, the selection of the blocks is accomplished in the same manner as above.

Figure 14:
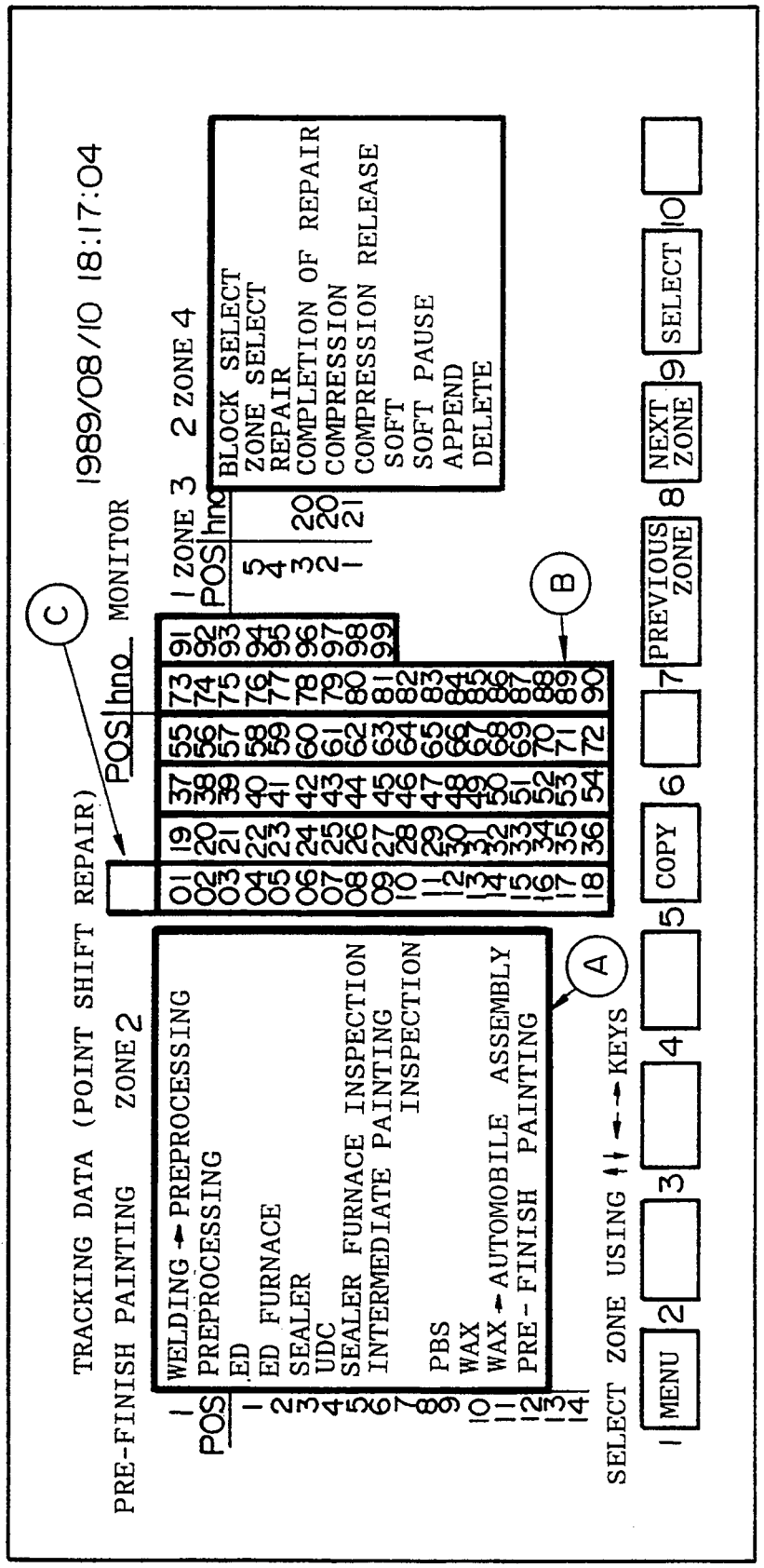

Furthermore, when "zone select" is selected as the processing, the zone numbers are displayed in part B of FIG. 14. Then, one of the zones can be selected using the cursor keys in the above manner. Furthermore, it is possible to directly input the zone number using the number keys of keyboard 102. In this case, the zone number thus inputted is displayed in part C of FIG. 14. After the zone number has been inputted, when the execution key is pressed, the same zone will be selected.

By means of the above processing, the hanger number display can be conducted with respect to a newly selected block or zone.

Figure 15:
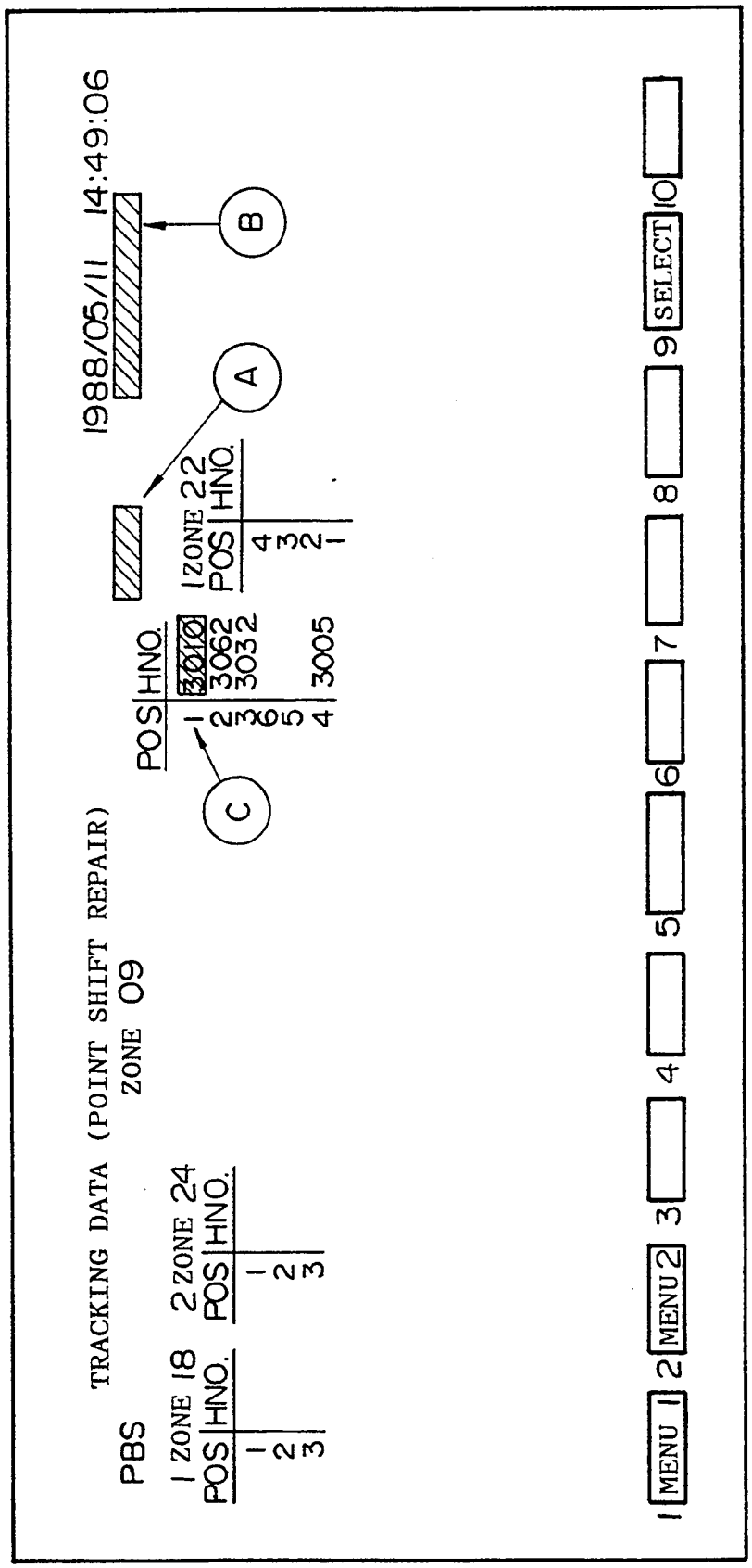

Next, when "correction" is selected as a processing item, as shown in FIG. 15, "correction in progress" is displayed in part A and the cursor is placed at position number 1 (see part C of FIG. 15). Then, by operating the cursor keys, ↑ and ↓ it is possible to change the position of the cursor. Furthermore, by pressing the "roll up key", or the "roll down" key, it is possible to conduct the roll up or roll down of the indicated hanger numbers. In addition, when numbers are entered using the number keys, the hanger numbers of the part indicated by the cursor can be rewritten. When the processing item "end of correction" is pressed after rewriting, CPU 105 writes the amended number value in the memory area of the corresponding shift register 80 and the correction of the hanger number is completed. The reason that this type of correction is necessary is that there may be cases in which the hanger reader 40 makes a mistake in reading. As the number value is written on each hanger 35, so that the hanger number is visible, it is possible for the operator to notice directly when a data hanger number and an actual hanger number differ and it is possible to make a correction by means of the above processing.

When the processing item "compression" within the menu display is selected, it is possible to display the zones before and after this zone, and when the processing item "begin compression" is selected, the compressed display screen returns to the bottom. When the processing item "shift" is selected, the data are shifted and the correction mode is proceeded to. In this mode, the scope of the hanger numbers which are to be shifted is specified, so that the start point and end point are indicated. When the cursor is moved to a desired position, and the "execution key" is pressed, the starting point is confirmed and when the cursor is again moved and the "execution key" is pressed, the end point is confirmed. Then, when the cursor is placed at the position to which movement is desired and the "execution key" is pressed, the TO point is confirmed and the part with the specified scope is moved to a position after the TO point. For example, in the case in which the hanger numbers are displayed in the order "1, 2, 5, 6, 7, 3, 4" and "5, 6, 7, 8" are moved to after "4", the result is "1, 2, 3, 4, 5, 6, 7, 8". That is the part with the specified scope is moved and reinputted.

Furthermore, in the case of the compressed display, movement to a neighboring zone is also possible. After such movement, if the processing item "end of correction" is selected, CPU 105 will rewrite the hanger number within the corresponding shift register 80 in the state after movement.

After the processing item "supplement" is selected, when the cursor is placed at the desired position and the "execution key" is pressed, that position is made empty and the following hanger numbers are shifted by one position. Then if a number value is inputted into the empty position, the supplementation of a hanger number can be conducted. This processing is conducted in the case in which a hanger is to be inserted on the line. Furthermore, when the supplement mode is selected, a supplement mode display is shown in part B shown in FIG. 15.

When the processing item "delete" is selected, confirmation of the start point and end point is made and after both points have been specified, and the "execution key" is pressed, the hanger numbers in the specified range will be deleted. This processing is conducted in the case in which hangers are taken off the line. When this delete mode is selected, a delete mode display appears in part B of FIG. 15.

II: Whole Data Correction Mode

This mode is established by initializing processing after the apparatus is turned on, or by a selection from the menu display; the display shown in FIG. 16 appears in CRT display apparatus 103. As shown in the diagram, the hanger numbers and body data (frame M, type of vehicle, derivation and the like) corresponding to each position are displayed. In the diagram, the display of the body data is omitted.

When function key f.9 is pressed, as shown in FIG. 17, the display of the processing items is conducted. Processing items "block select" and "zone select" have the same processing content as in the above case. When the processing item "correction" is selected, it is possible to correct the indicated data. This is accomplished by moving the cursor to the part which is to be corrected and then inputting number values. When the processing item "end of correction" is selected, the corrected data are written into memory M and shift register 80 at the same location by CPU 105.

III: Hanger Correspondence Correction Mode

This mode is established by a selection from the menu display shown in FIG. 11; the screen display is as shown in FIG. 18. Here, when the function key f.9 is pressed as shown in FIG. 19, the processing items are displayed in Part A. Here, when hanger numbers are inputted by means of the number keys, CPU 105 reads the body data corresponding to tile hanger numbers from memory M and supplies this to CRT display apparatus 103. As a result, data are displayed in each part (frame number, type of automobile, etc.) shown in FIG. 19. Next the cursor is moved to the part which is to be corrected, and a number value is inputted, and when processing item "end of correction" is selected, the corrected data are written into the corresponding location in memory M.

Furthermore, in the state shown in FIG. 19, when the cursor key "_ is operated, the cursor moves to the frame number line. Here, when a frame number is inputted using the number keys, CPU 105 searches memory M using the frame number as a key and reads the corresponding body data and hanger number. These data are displayed on each line in the same way as in the above case, and the correction thereof, can be conducted.

As explained above, in accordance with the present invention, it is possible to obtain a concentrated overview of the data relating to, for example, the position of an item to be processed on the production line or the level of the flow number of the bodies in each process, and by means of this, the management of production speed and the like, the discovery of irregularities, and obstruction countermeasures can be conducted quickly.

(5) Automatic diverging processing

In case in which the number of vehicles in the process following the end of operations or night storage becomes large, the operator in the central control room conducts the following processing. First, the state of the line is displayed in CRT display apparatus 103 (FIG. 10A and 10B) of computer 64. This display is conducted based on an understanding of the positions of each body which is obtained by the observation of the tracking data described above. A body which is to be switched to night storage (electrodeposition night storage 22, sealer, night storage 23, intermediate painting night storage 24 and finish painting night storage 25) is confirmed from the display screen, the hanger number of the hanger 35 on which this body is placed is inputted from keyboard 102 and a command for the purpose of switching hanger 35 to night storage is inputted. As a result, a value of "1" appears in the fixed flag of the area of memory m which stores the hanger number. After this, the operator conducts processing identical to that described above with respect to the hangers 35 which are to be switched to night storage. The operator may also determine which bodies are to be switched to night storage by means of a visual observation of the actual painting line. Next, when a hanger 35, the flag of which has been raised by the above processing, is moved to the vicinity of night storage, the hanger 40 shown in FIG. 9 reads the hanger number thereof. The hanger number thus read is supplied to CPU 105, and CPU 105 refers to the interior of memory M, using this hanger number as a key. When it has been detected by this reference that the flag of this hanger is raised, CPU 105 outputs a control number which retracts diverging cylinder 123 and diverging plate 122 rotates, and the hanger 35 is guided onto night line 125. Then the dog 126 of the hanger 35 which is guided onto night line 125 is detected by limit switch 127, and a detection signal is supplied from limit switch 127 to CPU 105. By means of this, CPU 105 supplies control which directs the extension of cylinder 130 and cylinder 130 extends the cylinder rod thereof, and the catch 132 on the lead end thereof engages dog 126 and draws it onto night line 125. By means of this, hanger 35 is conveyed by the conveyer of night line 125, and the switching is completed. Switching which is identical to that described above is conducted with respect to hanger having raised flags; when hangers which have flags which are not raised arrive, the diverging plate returns to the position shown by the solid line in FIG. 9, so that these hangers proceed directly along main line 120. In this way, only hangers which have flags raised in advance are drawn onto night line 125. The hangers 35 which are so drawn are conveyed in succession along night line 125, and when the lead hanger 35 reaches the vicinity of the exit of night line 125, the motion thereof is controlled by a stopper (not shown in the diagram). The motion of the following hangers 35 is controlled when they approach the preceding hanger 35. Next, when a hanger 35 in night storage is switched to the main line, the operator sends instructions to this effect to CPU 105 using keyboard 102. As a result, an apparatus which is identical to the apparatus shown in FIG. 9 conducts operations which are opposite of those of the above case, and hangers 35 are moved in succession onto the main line. As explained above, by means of the present invention, it is possible to conduct switching operations to night storage using few workers and to conduct unified switching by means of remote manipulation.

(6) Operation of night storage

The operator conducts a display such as that shown in FIG. 20 in CRT display apparatus 103. The name of the night storage is displayed in the left hand column in this display and in the right hand columns the base vehicle number, present vehicle number and release numbers are displayed. Here, a number of bodies which is slightly smaller than the number of bodies which can be inputted into the process after each night storage (expiration vehicle number) is meant by the base vehicle number. When the number of bodies of the following process exceeds the base vehicle number an alarm is generated. The present vehicle number is the number of vehicles which are in the process following night storage at the present moment. The release vehicle number is the number of vehicles at which the above alarm can be released. The base vehicle number and release vehicle number are set in the fixed area of memory m (see FIG. 10A and 10B) and furthermore, by operating keyboard 102, it is possible to change the values thereof. The present vehicle number is detected by the examination of the tracking data by CPU 105. That is, CPU 105 can determine the number of vehicles in a block or zone corresponding to the process following a night storage by means of examining the tracking data within each shift register 80 through the medium of communication interface 104. In addition, this present vehicle number is displayed in the corresponding display column.

Hereinbelow, the processing of bodies between electrodeposition night storage 22 and sealer 4, which is the process which follows this night storage, will be explained as an example of the above.

When the diverging apparatus (see FIG. 9) at the input side of electrodeposition night storage 22 is switched to the main line side, the bodies do not enter electrodeposition night storage 22, but rather are inputted into sealer 4 in order. Accordingly, in sealer 4, seal processing is conducted, however, in the case in which the flow number of the bodies is fast in comparison to the processing time, the number of bodies within sealer 4 quickly increases. This body stock number, that is, the present vehicle number, is monitored at all times by CPU 105, so that when this number exceeds the base vehicle number, CPU 105 detects this, and generates an alarm from alarm generator 106. By means of this, the operator is made aware that the night storage should be employed. Here, the operator operates keyboard 103 and selects a shunting path from the "operational direction" column of FIG. 20. This selection operation is accomplished by moving the cursor to "shunting path" and pressing the recording key. By means of this, the following processing is conducted on a fixed number of bodies which are upstream from the input side diverging apparatus of electrodeposition night storage 22. That is, a value of "1" is placed in the fixed flag of the corresponding memory area within memory M, in which the hanger numbers of the hangers on which the bodies are placed are stored. The fixed number used in this case is the number which can be accepted by electrodeposition night storage 22. This number is obtained by subtracting the number of hangers present at the time on electrodeposition night storage 22 from the maximum amount of hangers electrodeposition night storage 22 can accept.

Next, when a hanger 35, the flag of which has been raised by the above processing, reaches the input side of electrodeposition night storage 22, the hanger reader 40 shown in FIG. 9 reads the hanger number thereof. The hanger number thus read is supplied to CPU 105 and CPU 105 refers to the contents of memory M using this hanger numbers as a key. When the fact that the flag of this hangers is raised is detected as a result of this reference, CPU 105 outputs a control signal which retracts diverging cylinder 123. As a result, diverging cylinder 123 is retracted and diverging plate 122 rotates, and the hanger 35 is guided onto night line 125. Then the dog 126 of the hanger 35 which has been guided onto night line 125 is detected by limit switch 127, and a detection signal is supplied from limit switch 127 to CPU 105. By means of this, CPU 105 supplies control which directs the extension of cylinder 130 and cylinder 130 extends the cylinder rod thereof, the catch 132 on the lead end thereof engages dog 126, and this is drawn onto night line 125. By means of this, hanger 35 is thereafter conveyed by means of a conveyer of night line 125 and the switching is completed. The above processing is conducted for hangers which have raised flags and such hangers are drawn onto electrodeposition night storage 22.

On the other hand, while the bodies are kept on electrodeposition night storage 22, the processing within sealer 4 continues, the present vehicle number decreases and becomes smaller than the release vehicle number, and CPU 105 cancels the alarm. By means of this, the operator understands that the use of night storage has become unnecessary, and selects the "normal path" shown in FIG. 20 for electrodeposition night storage 22. This selection operation is conducted in the same manner as the above case. In addition, when this processing is conducted, the flags which were raised at the time of the selection of "shunting path" are all cleared. Then, when a hanger which does not have a raised flag comes to the input side of electrodeposition night storage 22, the diverging plate returns to the position shown by the solid lines in FIG. 9, and this hanger proceeds directly along main line 120.

On the other hand, the hangers 35 which were drawn onto night storage are conveyed in order along night storage 125, and when the lead hanger 35 reaches the vicinity of the exit of night line 125, its motion is controlled by means of a stopper (not shown in the diagram). The motion of the following hangers 35 is controlled when they reach the vicinity of the preceding hanger 35. Here, when a hanger 35 which is in night storage is switched to the main line, the operator sends a direct indication to that effect to CPU 105 using keyboard 102. As a result, a diverging apparatus which is identical to the apparatus shown in FIG. 10 conducts operations in the reverse order of the above case and hangers 35 are transferred in order to the main line. In this case, these hangers are appropriately combined with the hangers conveyed along the main line.

In the above manner, it is possible to efficiently operate the night line in correspondence with the present vehicle number of the following process. In the above explanation, the electrodeposition night line 22 was taken as an example; however, identical processing is conducted in the case of the other night lines.

(a) Full-finish at the time of termination

Among the processes which follow the night lines, there are processes which are to be emptied and processes which are to be left full at the time of the termination of one day's work as a result of the operational conditions. Here, the night line operational processing of the case of a following process which is to be left full, will be explained.

At the end of the day's operations, the operator inputs bodies in order into the following process. As a result, the present vehicle number of the following process exceeds the base vehicle number and an alarm is generated from alarm generator 106. By means of this, it is possible for the operator to immediately know that the full-finish vehicle number will soon be reached. In addition, as the number of vehicles from the base vehicle number to the full-finish vehicle number is known in advance, flags are raised within memory M for those hangers which are upstream which exceed this number of vehicles. As a result, the number of vehicles which will cause the following process to become full pass by the night storage; however, the other bodies have raised flags, so that they are drawn onto the night storage. In this way, the following process is automatically filled and the extra bodies are absorbed by night storage.

(b) Sending of bodies at the time of the beginning of operations

Next, the processing of the sending of bodies from night storage at the beginning of operations will be explained. Here, a case will be taken as an example in which the following process is full, and furthermore, a fixed gap is created in advance in front of the night storage.

First, when operations are begun, the processing of the following process proceeds in order and moreover, a gap has been created in front of the night storage and since this gap part enters the main line, the present vehicle number of the following process becomes smaller. In addition, when the present vehicle number becomes smaller than the release vehicle number, an alarm is triggered and by means of this, the operator understands that bodies should be sent from night storage. Then, the operator inputs a command which causes bodies to move from night storage by manipulating keyboard 103. As a result, CPU 105 conducts control on the diverging apparatus at the output side of night storage such that the bodies flow together, and by means of this, the bodies within night storage are guided by the diverging plate of the diverging apparatus on the output side, are transferred to the main line and enter the following process.

As explained above, by means of the present invention, it is possible to manage the body input and output of night storage in a concentrated manner.

(7) Display by Color

When the operator operates keyboard 102 and selects the display by color mode, the display shown in FIG. 21 is conducted on CRT apparatus 103. In this display mode, a display is made of the number of bodies of each color which are on the line. That is, the names of the colors are displayed as codes as shown in the diagram and beside this, the number of bodies is displayed. This is conducted by accumulating the number of bodies having the same color by means of the reference of CPU 105 to memory M (see FIG. 6), and then conducting a display on CRT apparatus 103 in accordance with the results of the accumulation.

The above display is a display by color for the entire line; however, it is possible to switch to a mode which conducts a display by color which is divided into a part from preprocessing to the UDC furnace and a part from central painting to the painting stock area. In this mode, as shown in FIG. 22, the two display columns on the left side display the number of vehicles in the former, while the two columns on the right side display the latter number of vehicles. CPU 105 is able to determine which shift register 80 of a sequencer 70-73 a specific hanger number is in, so that it has an overview of the number of bodies by color in each process from this and from the data within memory M, and thus conducts the above display.

The display shown in FIG. 22 has the following meaning. In processes prior to the UDC (undercoating), no color is attached to the bodies, while after intermediate painting, painting has been conducted on the bodies so that it is possible to know the proportion of the body numbers before and after painting from FIG. 22. Furthermore, it is possible to know the colors which will be painted so that, for example, it is possible to know in advance whether the painting of a certain special color is to be conducted. In the case of a special color, as a paint is used which is not normally used, it is necessary to verify whether the preparation therefor has been completed or not; however, it is possible to know in an accurate manner the timing at which the verification is to be done by means of the above display.

(8) Processing Corresponding to Color

Next, processing corresponding to color will be explained, for example, in the case in which a breakdown has occurred in the painting apparatus for the color red, the operator indicates that the flags of the bodies which are to be colored red and are prior to UDC are to be raised by means of operating keyboard 102. As a result, CPU 105 raises the flags of the bodies which correspond thereto in the interior of memory M. The flags are attached to the memory areas of the body data as shown in FIG. 6.

Next, when a hanger 35 which has a flag which has been raised by the above processing reaches the input side of electro-deposition night storage 22 (or sealer night storage 23) the hanger reader 40 shown in FIG. 9 reads the hanger number thereof. The hanger number which has thus been read is supplied to CPU 105, and CPU 105 refers to memory M using this hanger number as a key. When it is detected by means of this reference that the flag of this hanger is raised, CPU 105 outputs a control signal which retracts the diverging cylinder 123. As a result, diverging cylinder 123 is retracted and diverging plate 122 rotates and the hanger 35 is guided onto night line 125. Then, the dog 126 of the hanger 35 which has been guided onto night line 125 is detected by limit switch 127 and a detection signal is supplied from limit switch 127 to CPU 105. By means of this, CPU 105 supplies control which directs the extension of cylinder 130, and cylinder 130 extends the cylinder rod thereof, the dog 126 is engaged by the catch 132 on the lead end of the cylinder rod, and the hanger is drawn onto night line 125. By means of this, hanger 35 is thereinafter conveyed by the conveyer of night line 125 and the switching is completed; hangers which have raised flags undergo the same processing and are drawn onto electro-deposition night storage 22 (or sealer night storage 23). In this way, when red bodies are drawn onto night storage, these red bodies do not proceed to the painting process, so that only painting processing of other colors is conducted. Accordingly, even if there is a breakdown of the red painting apparatus, painting is continued with respect to the other colors without a stoppage of the line. Furthermore, since the red bodies are retained on night storage, it is possible to reduce the recovery time of the red painting apparatus. After recovery, the keyboard is operated and the flags within memory M are cleared. Then, the bodies which have cleared hangers are discharged in order from night storage and the painting of the red bodies is conducted. In the above example, the following modifications are possible.

It is possible to supply self-diagnostic mechanisms in the painting apparatuses and to raise the flags within memory M automatically based on a breakdown detection signal from these self-diagnostic mechanisms. By means of such a structure, the bodies which have the same color as a painting apparatus which has broken down, will be automatically conveyed to night storage. Furthermore, in the case of recovery as well, a structure in which flags are cleared based on a recovery-detection signal from the self-diagnostic mechanism is permissible.

As explained above, by means of the present invention, it is possible to obtain a concentrated overview of the colors of the bodies which are in each process, and by means of this, it is possible to increase productivity. Furthermore, it is possible to automatically place bodies with a fixed color on stand-by and thus it is possible to conduct efficient painting processing.

(9) Detection of hanger abnormalities a: Abnormality detection from the tracking data As stated above, the shift registers 80 within sequencer 70-73 shift the hanger numbers in correspondence with the movement of the hangers. That is, they conduct the tracking of the hanger numbers. In addition, each sequencer 70-73 transmits the contents of the shift registers 80 to computers 65-67 at the timing at which a body B is transferred to a downstream side hanger conveyer. This transmission is conducted with respect to at least one of the computers 65-67, and by means of this, the hanger numbers within each shift register 80 (tracking data) are preserved in a duplicated form. In addition, in the case in which one of the sequencers 70-73 goes down, the hanger numbers are transmitted from one of the computers 65-67 to the shift register 80 of this sequencer.

By means of the above tracking processing, if the contents of the shift registers 80 within each sequencer 70-73 are read out, it is possible to know the hanger numbers of the hangers which are proceeding along the line. In addition, an operator at the site compares the hanger numbers read by the hanger reader provided at the input side of each block or at the input side of each robot with the hanger numbers of the hangers read out from shift registers 80. If both hanger numbers are in agreement, there is no problem; however, in the case of nonagreement, a hanger abnormality has occurred. The causes of this are that there is some abnormality in hanger plate 35, or that a hanger number has not been correctly read.

b: Detection of abnormalities based on the output of sensors

A plurality of sensors for the examination of the inclination of the bodies are provided at the part at which hanger 35 transfers the bodies to transfer apparatuses 58a-58e. These sensors detect the fixed parts of the bodies, and if the detection results of each sensor are appropriate, then there is no problem. However, if the body is inclined, the detection results of one of the sensors will be inappropriate and the hanger will be judged to be abnormal. In addition, CPU 105 reads the output signals of the above sensors through the medium of C/V control boards 51-54, and by means of this the abnormality of the hangers is determined.

(10) Display and processing of hanger abnormalities

CPU 105 conducts the following processing with respect to the abnormalities of the hangers which have been detected in the above manner.

Figure 23:

First, when keyboard 102 is operated, and the hanger abnormality display mode is selected, CPU 105 conducts the abnormality display shown in FIG. 23. As shown in the diagram, six hangers are grouped together and treated as one item; in all, four such items are displayed. That is, at most 24 abnormal hangers can be displayed on one screen.

Figure 24:
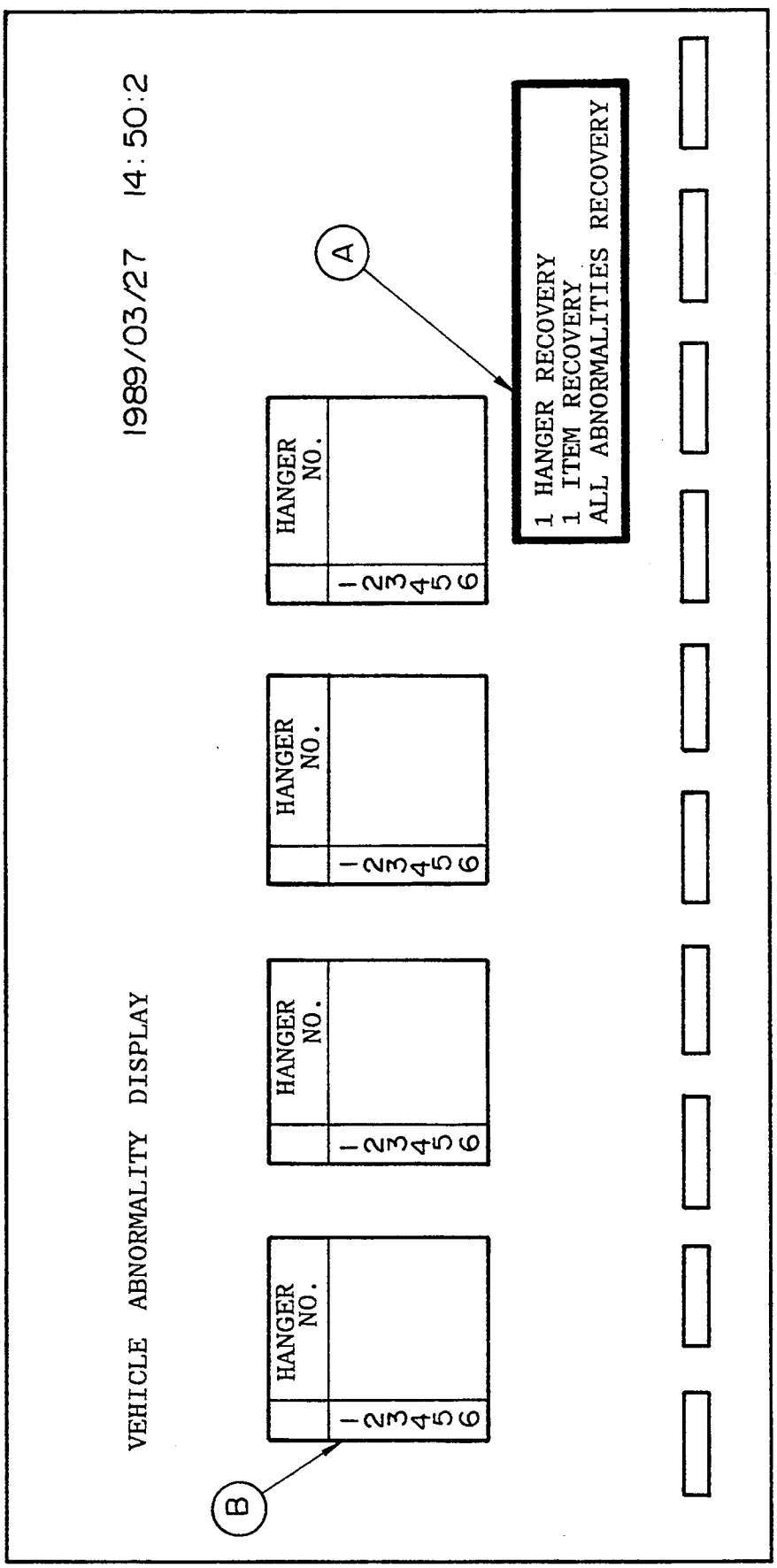

The hanger numbers of the hangers which have been judged to be abnormal by means of the above processing are displayed in order from the first position in the first item (the item on the extreme left). Here, in the case in which repair of the hangers is to be conducted, keyboard 102 is operated and repair mode is selected. When repair mode is selected, the menu display shown in the lower right of the screen shown in FIG. 24 is conducted. In this menu, there are three choices "repair one hanger", "repair one item", or "repair all abnormalities"; one of these is selected using the cursor keys or the like.

The "repair 1 hanger" mode directs the individual repair of each hanger; when this mode is selected, by pressing the ← and → cursor keys, the item which will be selected can be changed to the right or left, and furthermore, by pressing the ↑ and ↓ cursor keys, the hanger number which will be selected can be changed in an upwards or downwards direction. By means of this type of operation, a desired abnormal hanger which is displayed can be selected. In the case in which a number of hangers are to be selected, it is preferable to conduct the above operations for each of these hangers.

Then, CPU 105 raises the flags which have been established corresponding to the selected hangers. These flags are provided within memory M, as shown in FIG. 6. The following processing is conducted on the hangers which have raised flags.

First, when a hanger 35 which has its flag raised by the above processing reaches the input side of the repair line, the hanger reader 40 shown in FIG. 9 reads the hanger number thereof. The hanger number thus read is supplied to CPU 105, and CPU 105 refers to the interior of memory M using this hanger number as a key. When it is discovered by means of the search that the same hanger has a raised flag, CPU 105 outputs a control signal which retracts diverging cylinder 123. As a result, diverging cylinder 123 retracts, diverging plate 122 rotates, and the same hanger 35 is guided onto repair line 125. Then, the dog 126 of the hanger 35 which has been guided onto repair line 125 is detected by limit switch 127, and a detection signal is supplied from limit switch 127 to CPU 105. By means of this, CPU 105 supplies control which directs an extension to cylinder 130, cylinder 130 extends the cylinder rod thereof, the catch 132 on the lead end thereof engages dog 126 and the hanger 35 is drawn onto repair line 125. By means of this, hanger 35 is conveyed thereafter by the conveyers of repair line 125, and switching is completed. On the other hand, with respect to those hangers which do not have raised flags, as the diverging plate returns to the position shown by the solid lines in FIG. 9, these hangers proceed along main line 120.

When a hanger 35 which is on the repair line is to be switched to the main line, the operator sends a directive to this effect to CPU 105 using keyboard 102. As a result, a diverging apparatus which is identical to the apparatus shown in FIG. 9 conducts operations which are the opposite of those in the above case, and hanger 35 is transferred in order to the main line. As a result, it flows appropriately together with the hangers which have been conveyed along the main line.

In the above manner, the processing for the transfer of abnormal hangers to the repair line, and the processing for the transfer of repaired hangers to the main line, are carried out automatically.

Next, the repair of one item will be explained. This is a mode which directs the repair of each abnormal hanger displayed in the item simultaneously; one of the items is indicated using the cursor keys "*" and "+". When an item is specified, the flags corresponding to the hanger numbers within this item (see FIG. 6) are all set to a value of "1". The processing which is carried out on the hangers with raised flags, is identical to that of the the case of the "repair one hanger" mode.

Furthermore, when the "repair all abnormalities" mode is selected, the flags corresponding to all of the hangers displayed are raised and these are transferred as a group to the repair line.

(11) Supervision in the operational state a: Supervision of abnormalities in the tracking data As described above, CPU 105 acquires an overview of the flow numbers of bodies B by examining the movements of hanger numbers within sequencer 80, and displays this in real time. Furthermore, as the flow numbers of bodies B can be interpreted in terms of block units or zone units, the occurrence of breakdowns resulting from increases or decreases in the numbers thereof can be detected. For example, upper and lower threshold limits can be set with respect to a standard flow number, and when the measured flow numbers exceed the threshold limits, an alarm display can be put into operation. Furthermore, CPU 105 stores the abnormal situations, times of occurrence and the like, in a fixed area of memory M. In addition, CPU 105 displays a countermeasure message when it displays a breakdown. Countermeasures have been researched in advance by means of experience; these messages are stored in a fixed area of memory M. In the case of breakdowns for which a number of countermeasures are possible, a message is stored for each countermeasure; however, the message with the highest probability is displayed. Furthermore, in the case in which recovery is not achieved by means of the displayed countermeasure, the operator indicates from keyboard 102 that the next countermeasure message is to be displayed. In this way, the countermeasures are displayed in order and this contributes to the investigation of the causes of the breakdowns.

b: Supervision of overloading

When the conveyer motor enters an overloaded state and the temperature thereof exceeds a fixed value, overload detector TH outputs an overload detection signal, and the overload detection signal is converted into a fixed code and supplied to CPU 105 (see FIG. 10) through the medium of one of the conveyer control boards 50–53. CPU 105 writes the code showing the overload into a fixed area of memory M. In this case, it is possible for CPU 105 to know which conveyer control board 50–53 the data are from, so that it stores data specifying the conveyer control board together with the overload code. In addition, time data indicating the time at which an overload occurred are stored. Here, when a display directive is inputted from keyboard 102, a display indicating an overload is conducted on CRT display apparatus 103 by CRT 105 based on the codes stored in memory M. In this display, the conveyers which have become overloaded are displayed together. The display of countermeasures is conducted in the same manner as in the case of the above a.

c: Supervision of diverging operations and the like

CPU 105 conducts the following confirming operations when diverging cylinder 123 is operated. First, if the electromagnetic valve is assumed to be set to an off state when diverging and an on state when not diverging, then if at the time of diverging the electromagnetic valve is in an off state, the cylinder rod should be retracted. At this time, if the lead end of the cylinder rod is detected by proximity sensor SE1, the cylinder rod will not be retracted and this will be judged to be an operational deficiency. Furthermore, in the case in which proximity sensor SE1 does not detect the cylinder rod at a time of nondiverging, despite the fact that the electromagnetic valve is in an on state an operational irregularity will be judged to have occurred. The instructions detected in this manner are stored together with data indicating the place of the breakdowns and the time thereof, in memory M. After this, in the case in which a display directive is inputted from keyboard 102, a display identical to that of the above case is conducted.

The countermeasure display is identical to that in the case a mentioned above. Furthermore, the detection of the above-mentioned operational irregularities is not only conducted in night storage, but rather, can also be conducted at stopper machines (machines for temporarily stopping hangers) which are provided at fixed points on the line.

d: Management of breakdown data

As stated above, data relating to each breakdown are stored in order in memory M and are divided according to type of breakdown in memory M. Furthermore, with respect to breakdowns upon which recovery processing has been conducted, the recovery time is stored together with the breakdown. In addition, CPU 105 stores the frequency of identical breakdowns. When a fixed display directive is inputted from keyboard 102, a list of the breakdown data is displayed on CRT display apparatus 103. At this time, if a display arranged by frequency is directed, CPU 105 displays the breakdown data by frequency in accordance with the frequency data stored therein.

As explained above, in accordance with the present invention, it is possible to display all the obstruction conditions of the production line together and also to easily gain an overview of the obstruction conditions. Accordingly, this contributes to the speed of recovery and the investigation of causes and the like.

(12) Display of the states of the stations within the production line

The station observation screens to which said CRT display apparatus 103 outputs will be explained. The screens of the CRT conduct displays based on the control signals outputted from CPU 105 and furthermore, the characters shown in the drawings represent the characters which are displayed on the screen.

These station observation screens display, in accordance with their layouts, the conveyance paths within the stations comprising the station names of "preprocessing, ED (electrodeposition)", "ED (electrodeposition) night storage", "sealer, UDC (undercoat)", "intermediate painting", "finished painting", "inspection", "PBSWAX wax", "finished painting prestorage"; for example, when the "preprocessing, ED (electrodeposition)" station is selected, a layout corresponding to the conveyance path within the station is displayed on the screen.

Figure 25:
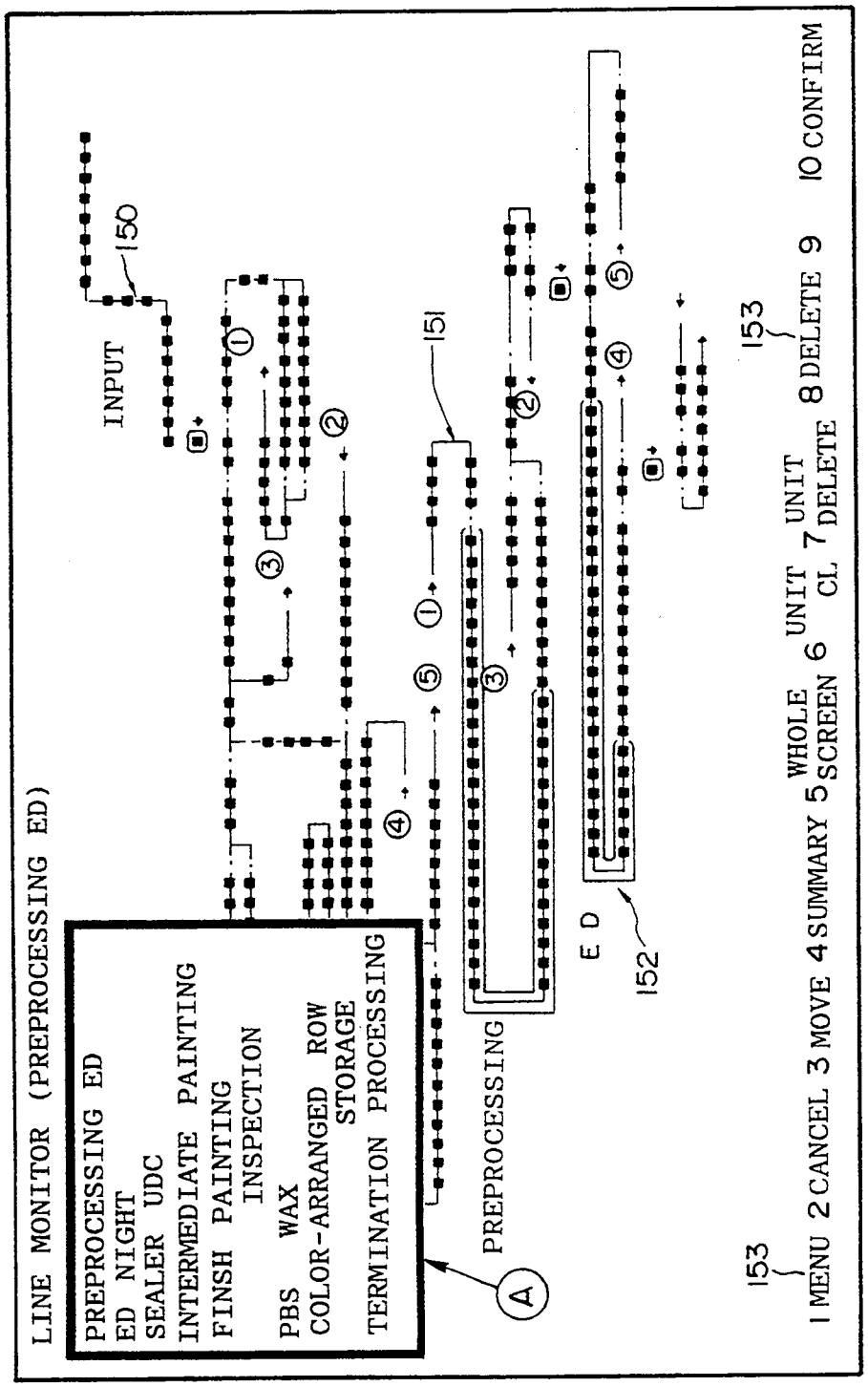
Figure 26:
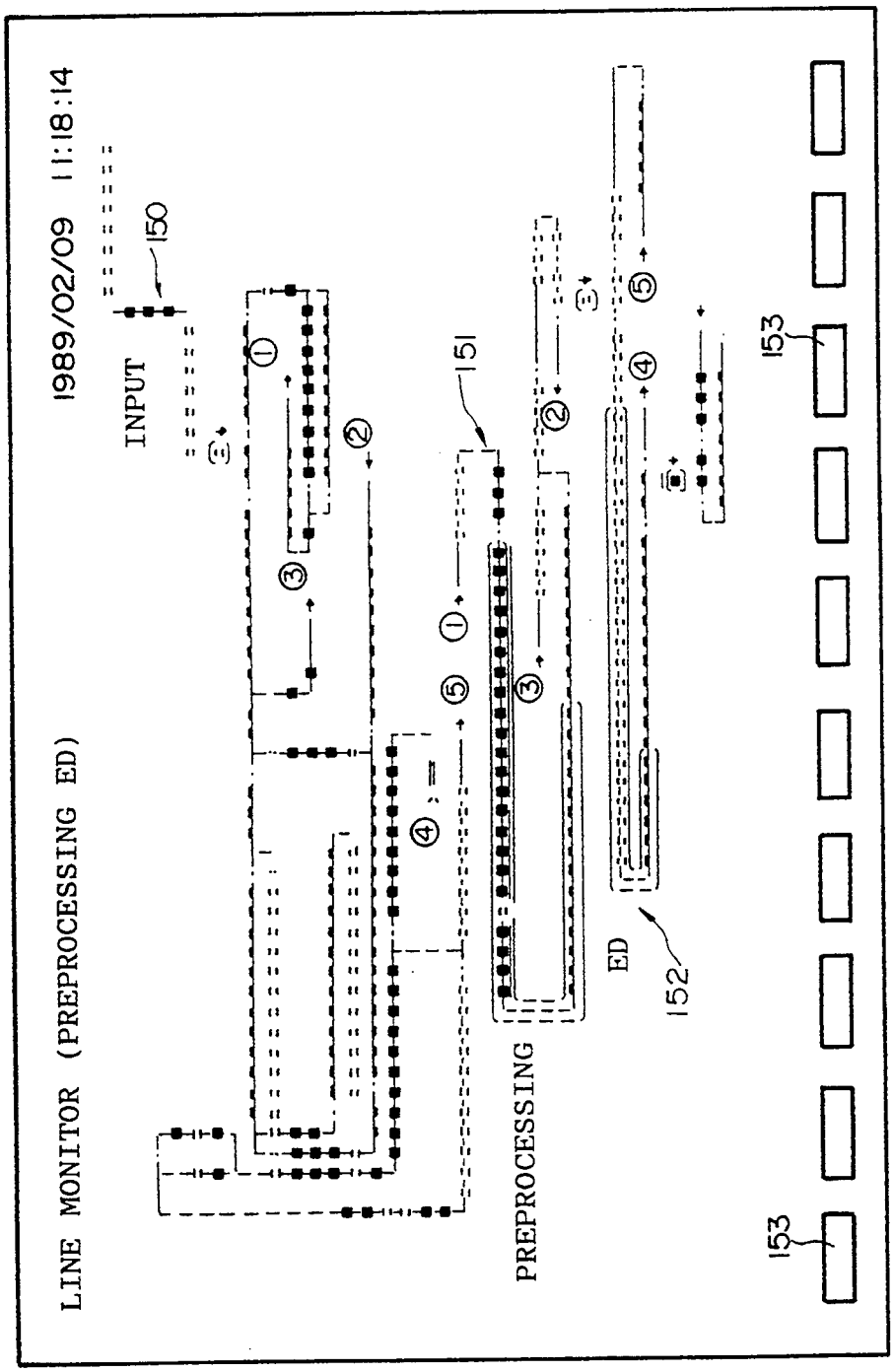
Figure 27:
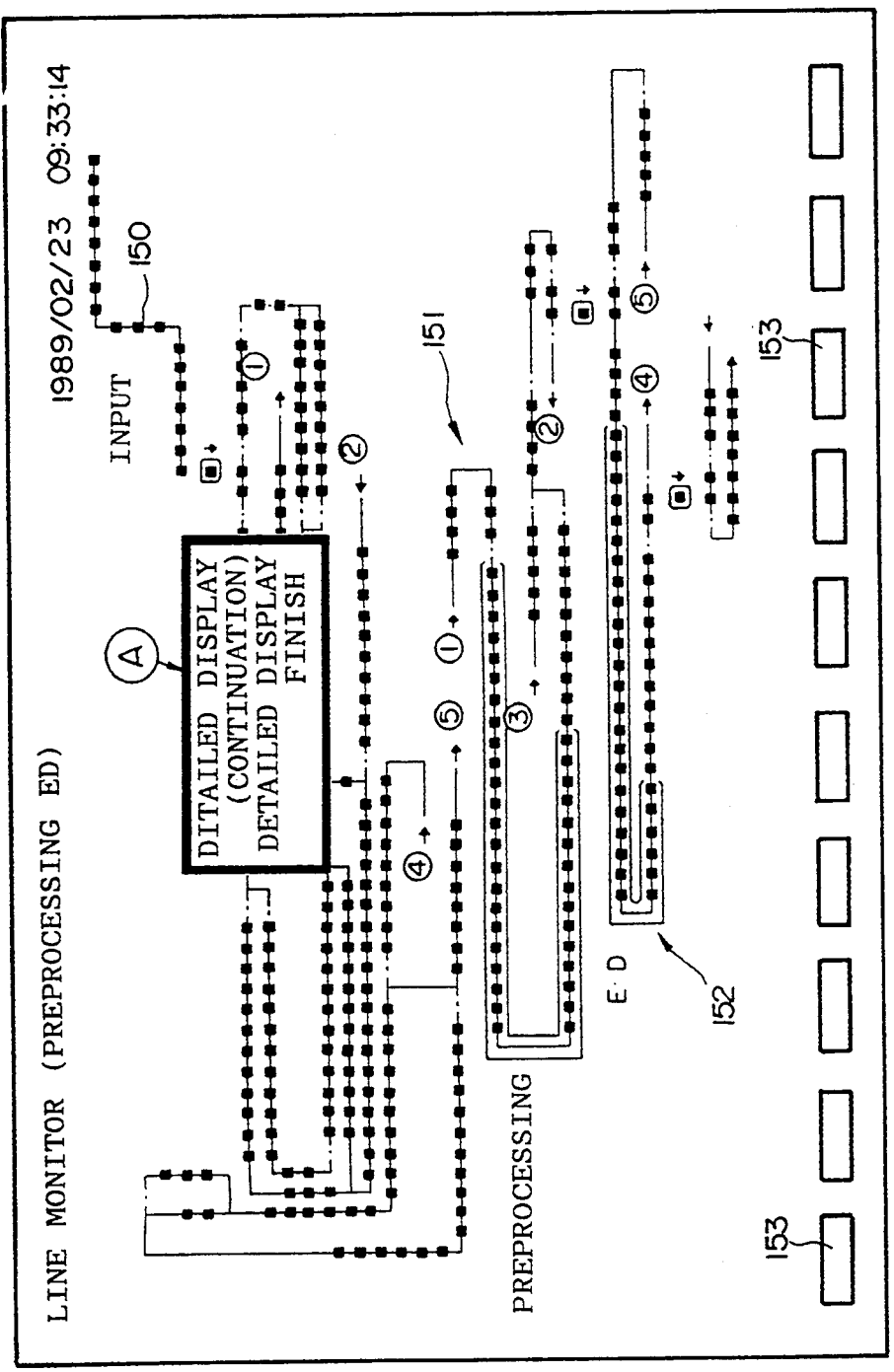

To explain more concretely, FIGS. 25-27 indicate observation screens which display layouts corresponding to the conveyance path within the "preprocessing. ED (electrodeposition)" station; on these screens, the input line display part 150 of the items to be processed, the preprocessing line display part 151, and the electrodeposition line display part 152 are provided in correspondence with their actual layouts.

Furthermore, a display part 153 which displays the functions of the function keys, is provided in the lower part of the screen. Here, when the function key f.1 of the keyboard 102 is pressed, a menu display appears in part A shown in FIG. 25. When function key f.1 is again pressed in this state the original screen is returned to. In the screen shown in FIG. 25, one of the items in the menu is displayed in a highlighted manner and by pressing the cursor keys ↑ or ↓ the highlighted position can be changed. Furthermore, in the case in which detailed data of the hangers is to be displayed, when f.9 is pressed, a menu display appears in the part A shown in FIG. 27. When function key f.9 is again pressed in this state, the original screen reappears. In the screen shown in FIG. 27, one of the items in the menu is displayed in a highlighted manner, and by pressing the cursor keys ↑ or ↓ the highlighted position can be changed. When "detailed display continuation" is highlighted and the execution key is pressed, the detailed display continuation mode begins and the cursor is displayed in the upper left hand corner of the screen; when the cursor is moved to the position for which a detailed display is desired by means of the cursor keys and the execution key is pressed, "hanger number", frame number", "type of vehicle", "derivation", "color", and the like, are displayed below this line (for example the twenty-third line or the like). At this time a monitor display is conducted at a part which is outside the display above the cursor. Furthermore, when the detailed display continuation mode is once selected, a detailed display is conducted continuously until the end of the detailed display is selected.

Figure 28:
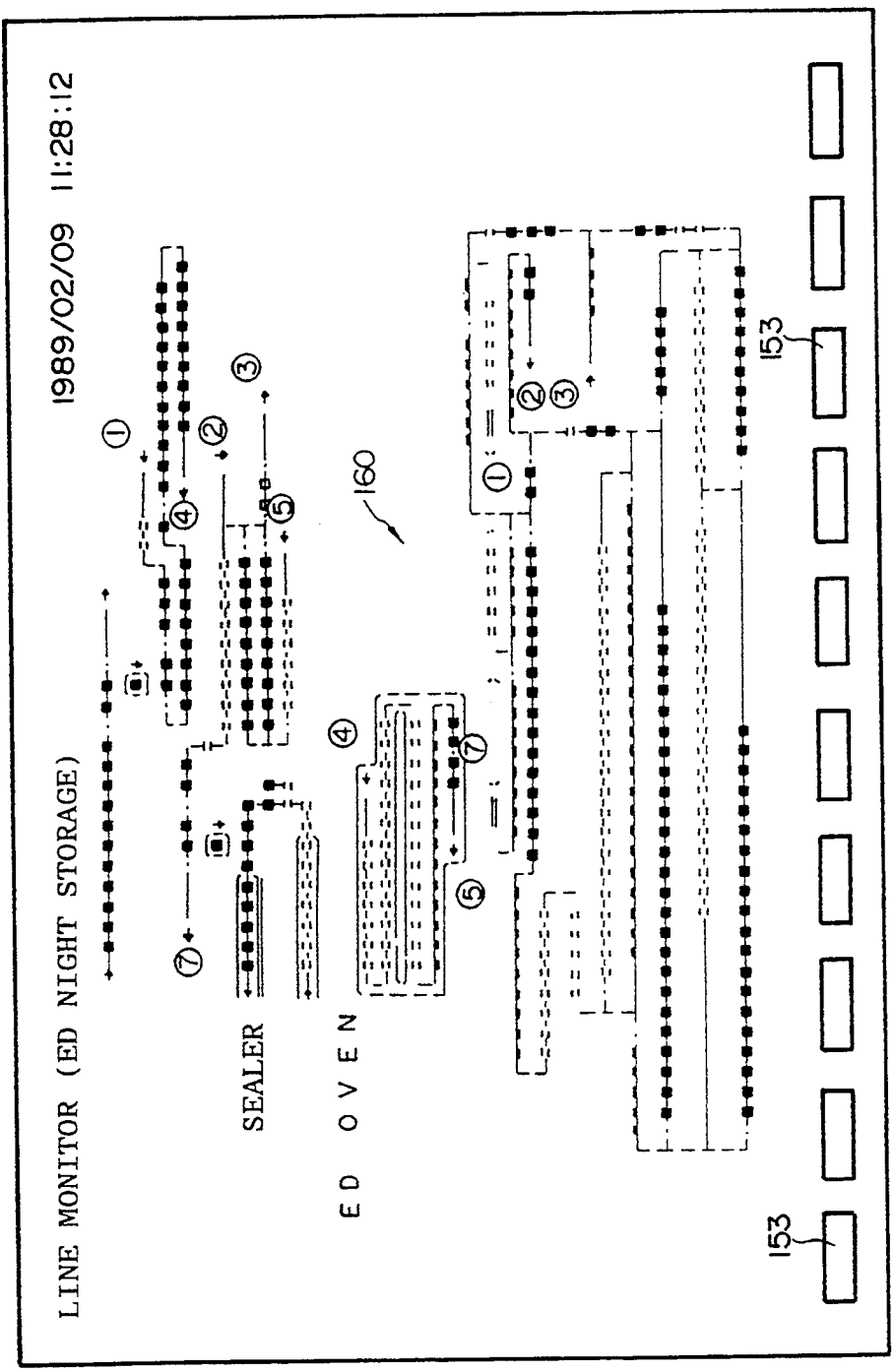
Figure 29:
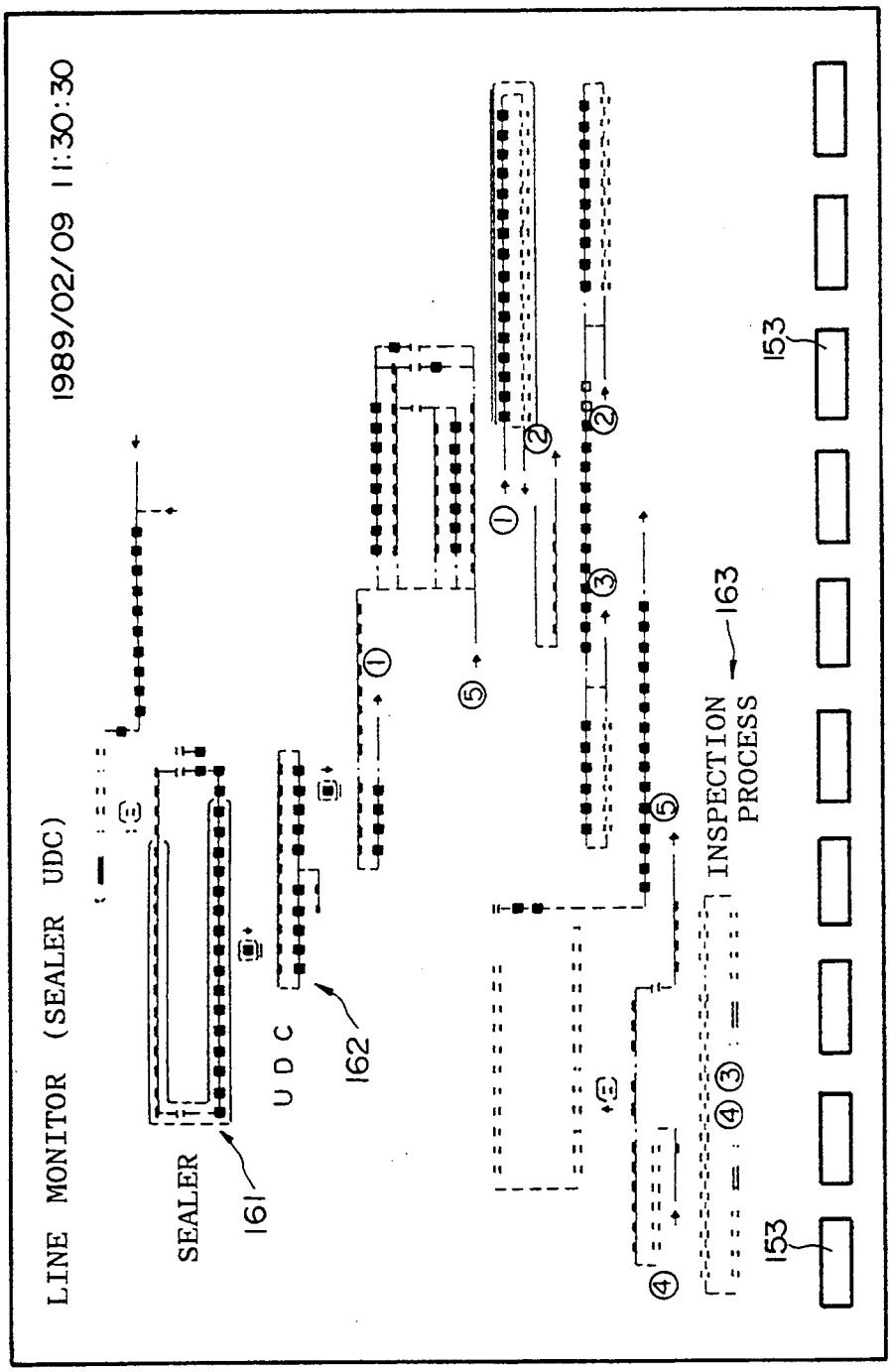

FIG. 28 is an observation screen which displays a layout corresponding to the conveyance path within the "ED (electrodeposition) night storage" station; on this screen a line display part 160 which corresponds to the layout of the electrodeposition night storage is provided in correspondence with the actual layout. Furthermore, FIG. 29 is a display screen which displays a layout corresponding to the conveyance path within the "sealer, undercoat" station; on this screen line display parts 161, 162, and 163 which correspond to the sealer, undercoat, and inspection layouts are provided in correspondence with the actual layouts thereof.

Figure 30:
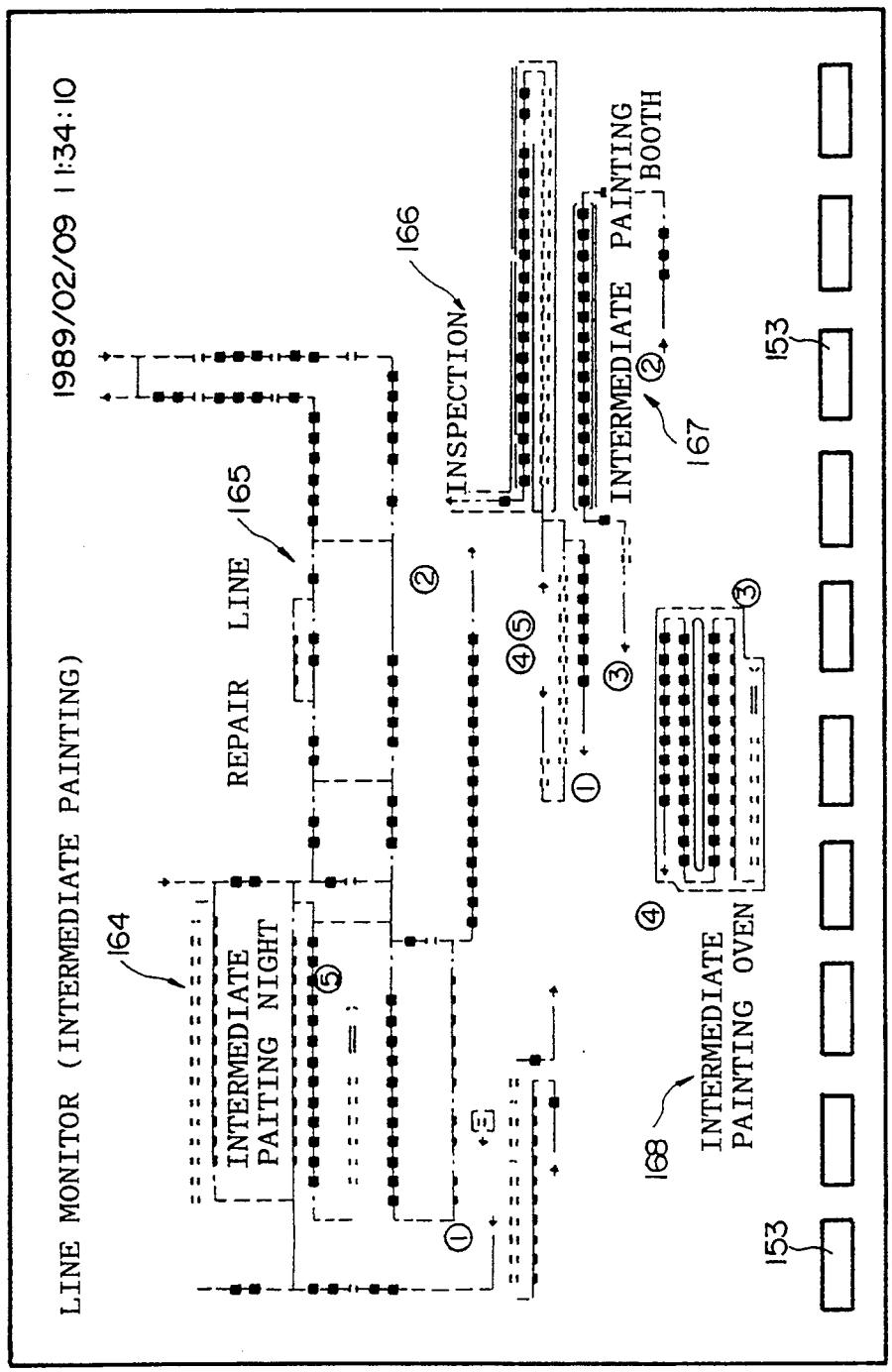

In addition, FIG. 30 is a display screen which displays layouts corresponding to the conveyance path within the "intermediate painting" station; on this screen line display parts 164, 165, 166, 167, and 168 which correspond to the intermediate night storage layout, repair line layout, inspection layout, intermediate painting booth layout, and intermediate painting oven layout are provided in correspondence with the actual layouts thereof.

Figure 31:
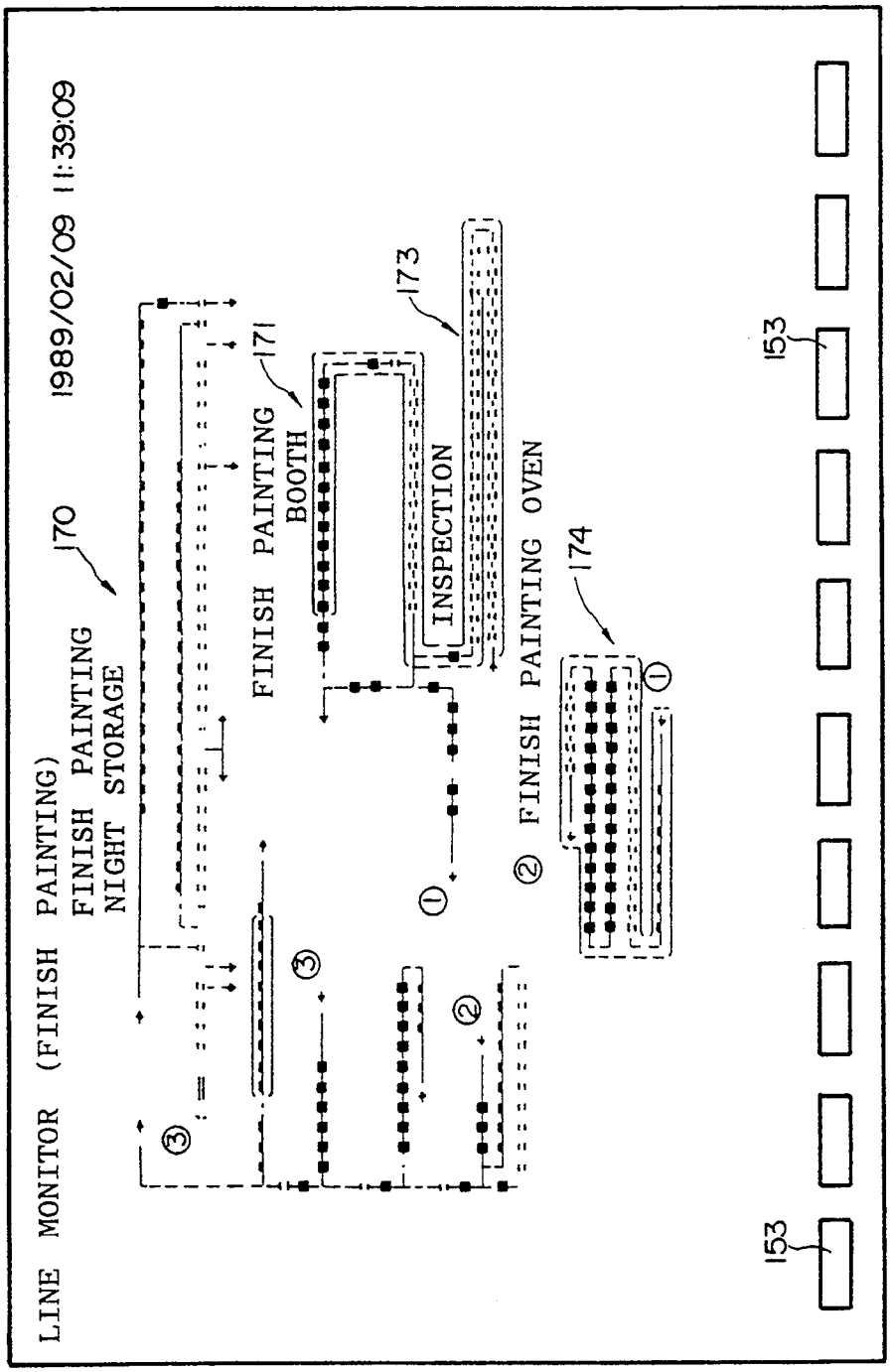

FIG. 31 is a display screen which displays layouts corresponding to the conveyance path within the "finish painting" station; on this screen line display parts 170, 171, 173, and 174 which correspond to the finish painting night storage layout, intermediate painting booth layout, inspection layout, and finish painting oven layout are provided in correspondence with the actual layouts thereof.

Figure 32:
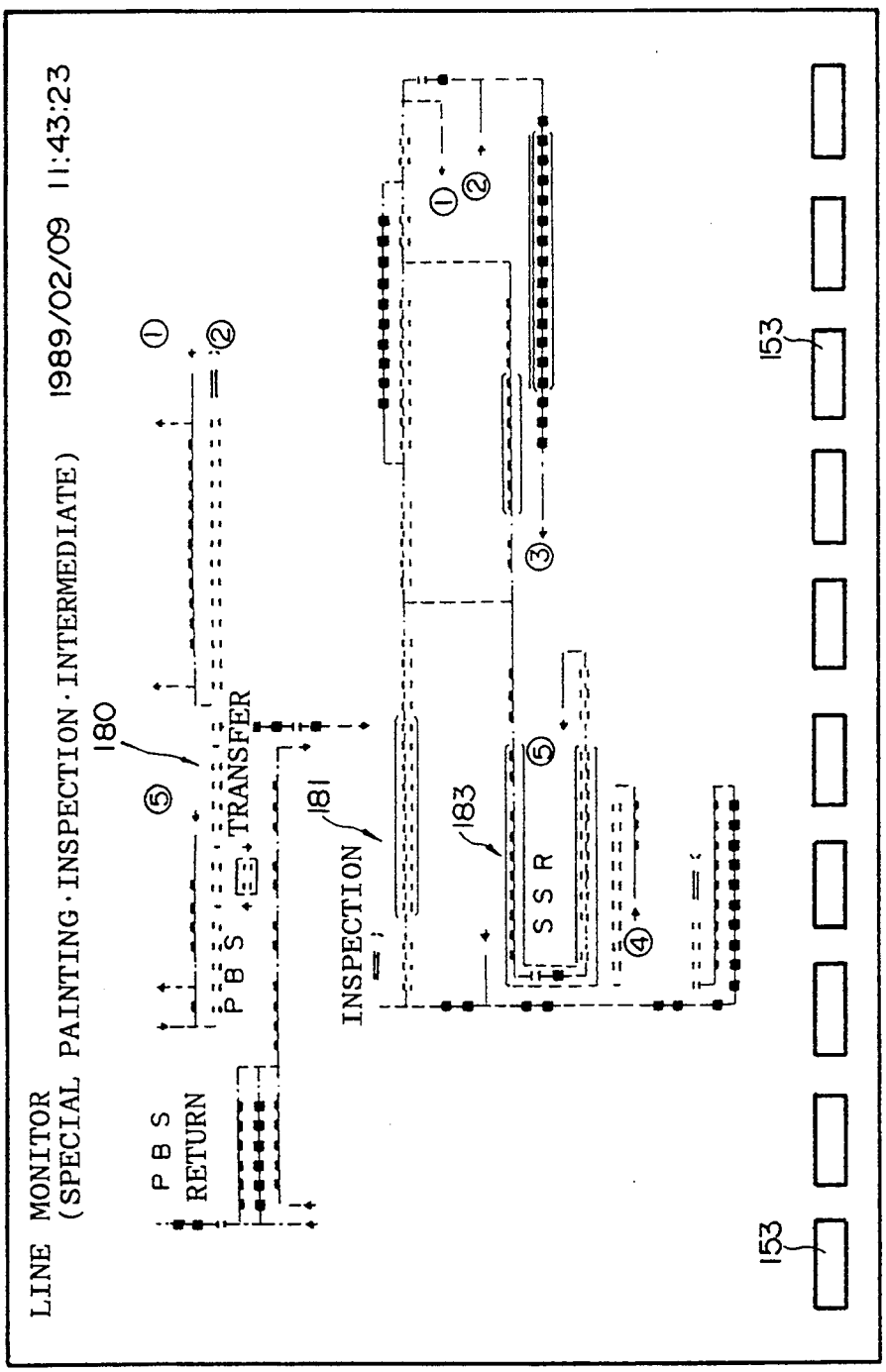
Figure 33:
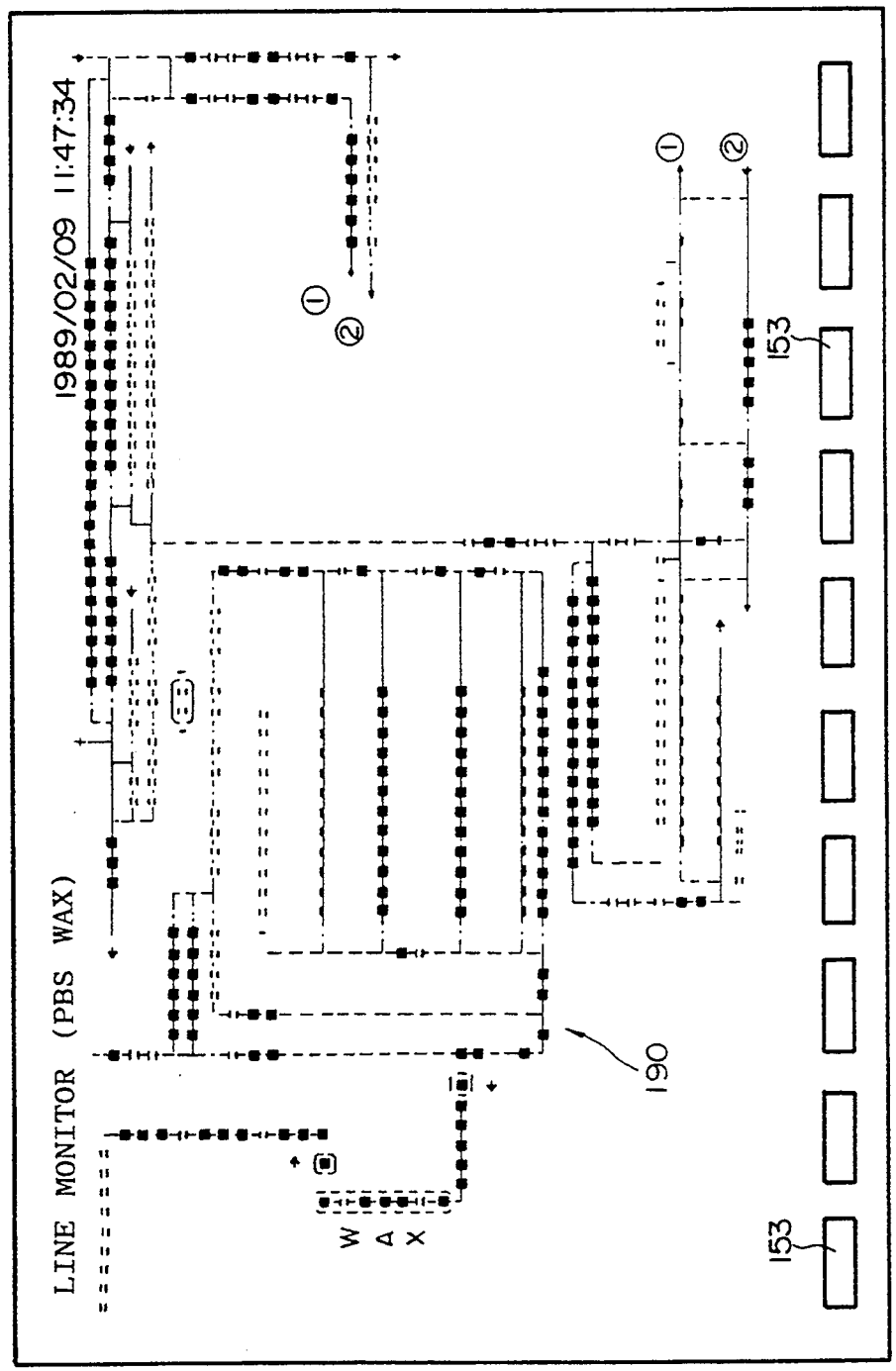

FIG. 32 is a display screen which displays a layout corresponding to the conveyance path within the "inspection" station; on this screen, line display parts 180, 181, and 183 which correspond to the transfer layout, inspection layout, and SSR layout are provided in correspondence with the actual layouts thereof. FIG. 33 is a display screen which displays a layout corresponding to the conveyance path within the "PPSWAX" station; on this screen a line display part 190 which corresponds to the layout showing the conveyance path of the WAX is provided in correspondence with the actual layout thereof.

Figure 34:
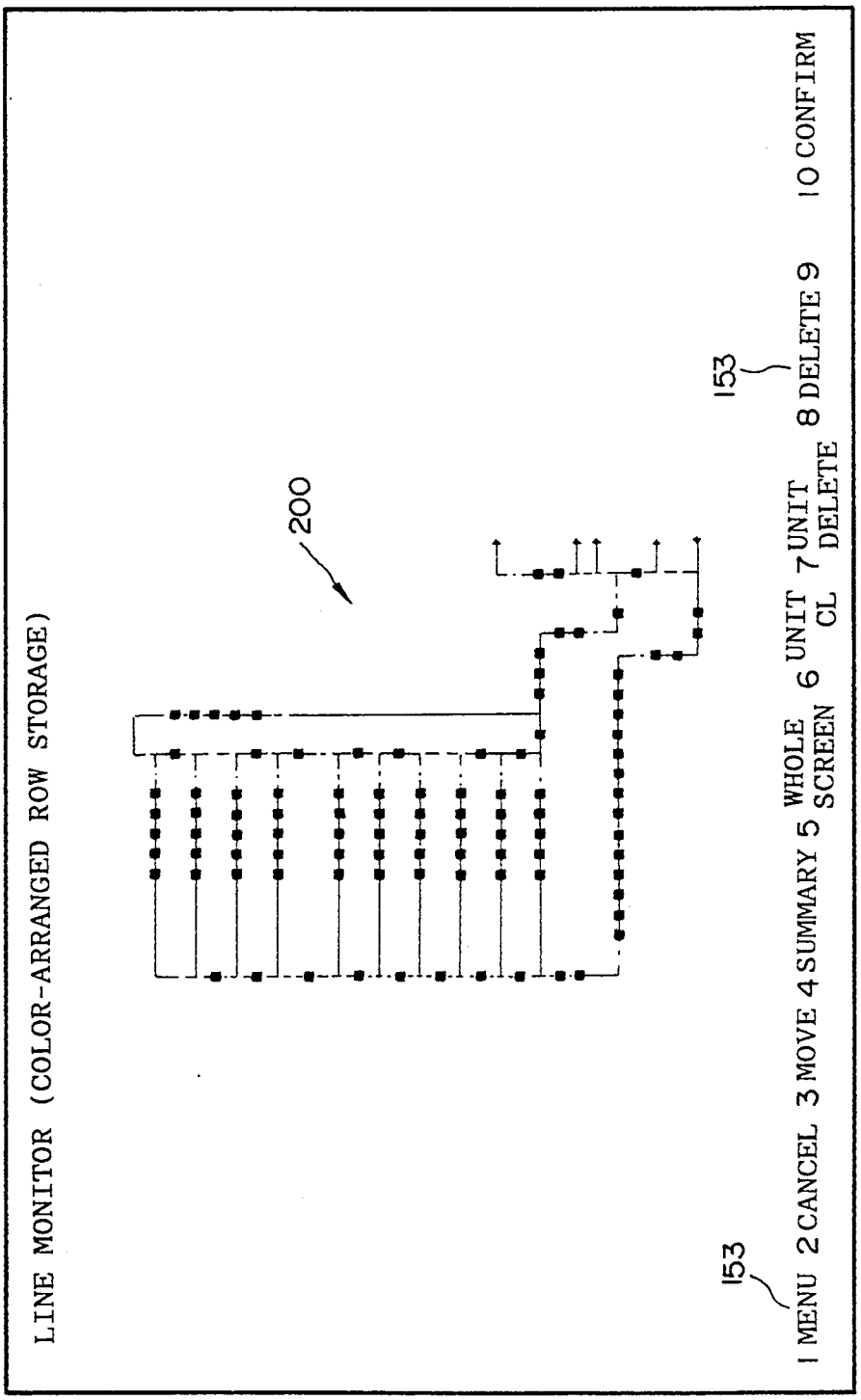

Furthermore, FIG. 34 is a display screen which displays a layout corresponding to the conveyance path within the "color-arranged row storage" station; on this screen a line display part 200 which corresponds to a layout showing conveyance path of the finish painting prestorage is provided in correspondence with the actual layout thereof. Switching to each said station observation display screen is, for example, accomplished by executing the menu which is brought up function key f.1; however, this is not necessarily so limited, for example, it could be conducted by means of pressing a switching switch (not shown in the diagram) which is provided on keyboard 102 and automatic switching after a fixed period of time is also possible.

In accordance with the screen display pattern explained above, the following are accomplished by means of CPU 105:

(a) Based on the detection signals from each station, the movement of the items to be processed within each station of CRT 103 is displayed on the station observation screens shown on FIGS. 10-19, and (b) After this, if function key f.9 is pressed and the detailed display continuation is executed "hanger number", "frame number", "type of vehicle", derivation", "color", and the like, are displayed below the line (for example, the twenty-third line or the like).

In the present example, it is possible to know the contents of each station in detail by successively switching the screen display by means of one CRT 103, however, this is not necessarily so limited; it is also possible to conduct the displays shown in FIGS. 10-19 by means of a plurality of CRTs.

Furthermore, the display part is not limited to a CRT but, rather can also be constituted by other display means.

(b) In the present example, the rewriting of memory M at the time of the transfer of a body B between two blocks was accomplished by temporarily substituting the identification code of transfer apparatuses 58a and 58b and then, writing a new hanger number. In contrast, it is also possible to omit the identification code of the transfer apparatus and to substitute the hanger number of a new hanger when a new body B is placed on this hanger.

As explained above, by means of the present invention, it is possible to acquire a concentrated overview of data when leading to the position of items to be processed on a production line and also relating to level of the numbers of bodies in each process thereof, and by means of this, it is possible to quickly conduct the management of production speed and the like, the discovery of abnormalities, and countermeasures to breakdowns,

(13) Other processes (a) Observation of conveyer stoppage

Figure 35:
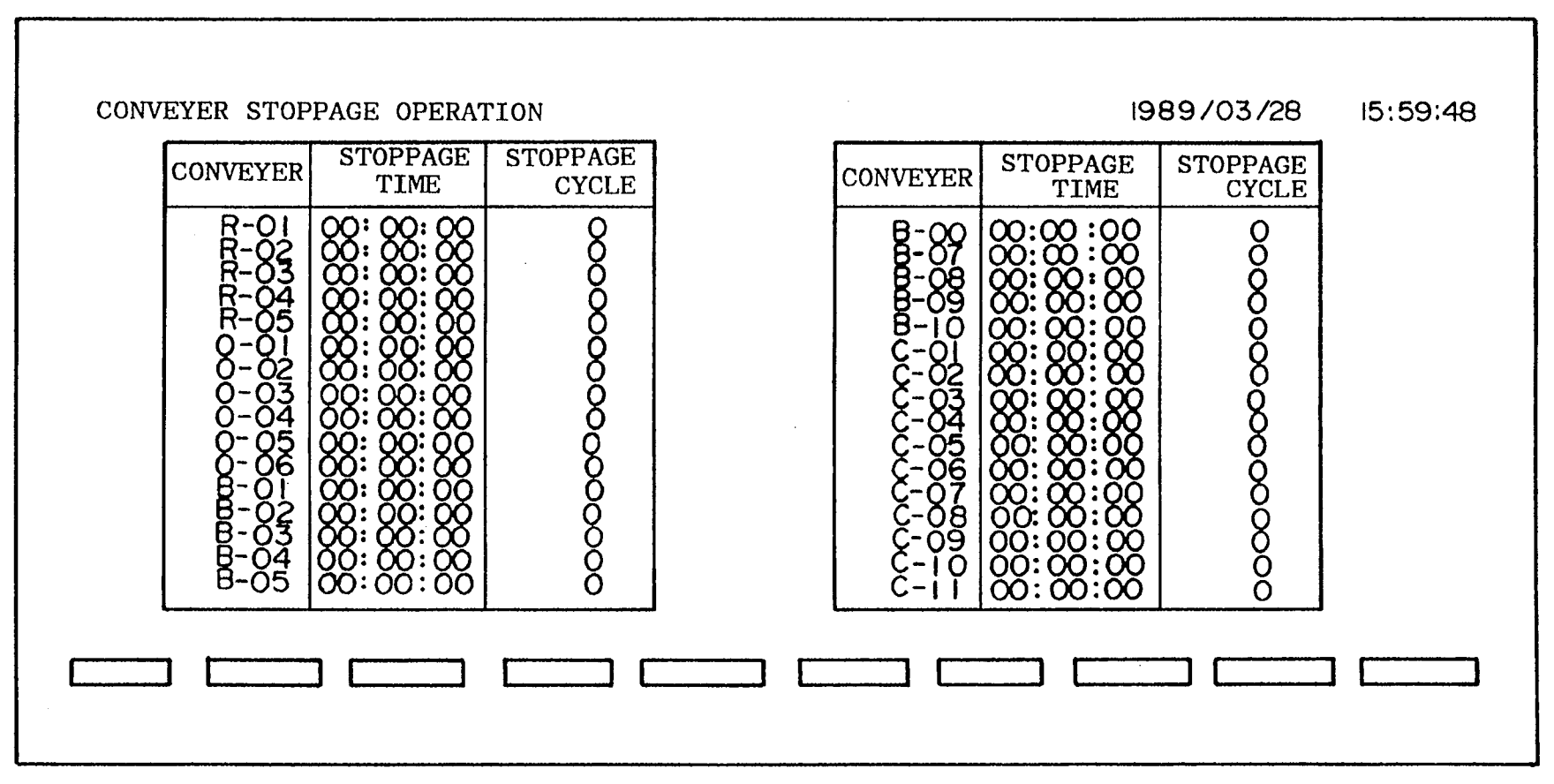

This is processing for the observation of the stoppage time and stoppage cycles of the conveyer. When computer control boards 50-53 conduct the stoppage of the conveyer motor, they communicate this to sequencers 70-73. Then CPU 105 fetches the stoppage data of the conveyer motor through the medium of communication interface 104, calculates the stoppage time thereof and displays this on CRT display apparatus 103. Furthermore, in the case in which a number of stoppages occur, the stoppage cycles are counted and displayed in CRT display apparatus 103. FIG. 35 shows an example of the display in this case. In the diagram, the names of the conveyers are displayed in the left hand column. Data which allow discrimination as to which conveyer the motor belongs to are added to the stoppage data of the conveyer motors which are outputted by conveyer control boards 50-53, so that based on this discrimination data, CPU 105 displays the conveyer names. The stoppage time is displayed in the central column of the tables shown in FIG. 35, and in the right hand column of the same table, the stoppage cycles are displayed.

(b) Instructions for movement to repair

It is necessary to provide a repair process for the repairing of defective bodies. When defective bodies are produced, the transfer thereof to a repair process is indicated by means of remote manipulation. In this process, first, the movement to repair instruction mode is selected (see the display screen in FIG. 36) and the hanger numbers of the hangers corresponding to the bodies which are to be repaired are inputted from keyboard 102. As a result, the inputted hanger numbers are displayed in part A of FIG. 36. Furthermore, it is possible to input the hanger numbers from a keyboard which is provided at the site (not shown in the diagram). In this case, the hanger numbers are transmitted to one of the sequencers 70-73 and then read by CPU 105. In either case, CPU 105 raises fixed flags which correspond to the hanger numbers. These flags are provided within memory M corresponding to each hanger number. In addition, an apparatus which is identical to the apparatus shown in FIG. 9 is provided on the input side of the repair process and hangers which have raised flags are drawn into the repair process by means of processing which is identical to the abovementioned diverging processing which leads to night storage. In the above manner, it is possible to draw indicated hangers onto the repair process automatically.

(c) Display of process flow numbers

Next, the display processing of process flow numbers will be explained. When process flow number display processing mode is selected, the display shown in FIG. 37 is conducted in CRT display apparatus 103. In the left hand part of this display, the occupation number (present), the gap vehicle number (empty) and the surplus vehicle number (space) of the bodies in each block are displayed. The names of the blocks are displayed in the addition name column. Here, what is meant by addition is the result of the addition of data relating to each zone comprising a block.

In the central part of FIG. 37, the vehicle numbers are displayed according to vehicle type, while in the right hand part of the same diagram, the vehicle numbers are displayed according to color.

Each display above is conducted based on the data within memory M.

Furthermore, when a fixed command code is inputted from keyboard 102, CPU 105 reads the speed of the conveyer motor detected by computer control boards 50–53 through the medium of sequencers 70–73, and displays the speed data thus read in CRT display apparatus 102. The operator is able to observe the speed of the conveyers by viewing this display.

(14) Paint-temperature adjustment system

Here, an example of a paint-temperature adjustment system to which the present invention has been applied in FIG. 2 will be explained.

Figure 38:
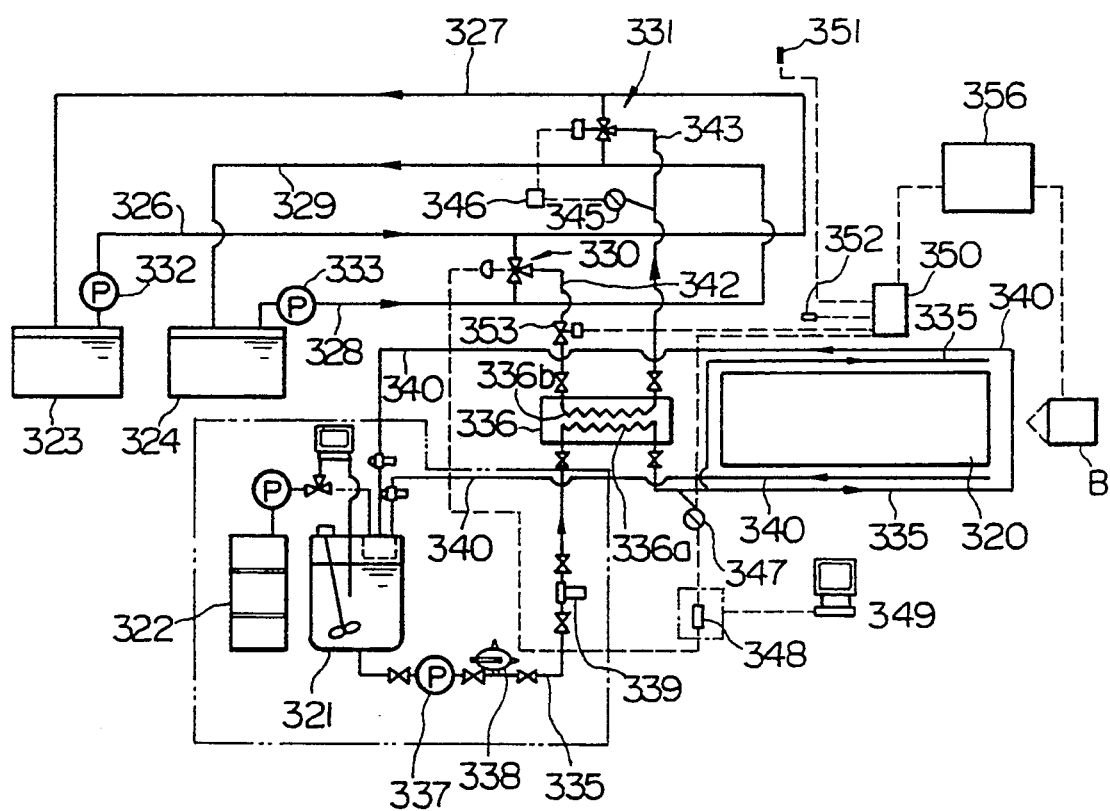
FIG. 38 is a structural diagram of a painting system to which the present invention has been applied.

In FIG. 38, reference numeral 320 indicates a painting booth to which automobile bodies (items to be painted) B are conveyed by means of a line which is omitted in FIG. 38, and which is provided with painting robots and the like in the interior thereof, reference numeral 321 indicates a mixing tank, reference numeral 322 indicates a drum can, reference numeral 323 indicates a cold water tank, and reference numeral 324 indicates a hot water tank.

The cold water which is stored in the cold water tank 323 has a temperature which is lower than the target paint temperature (for example, $25°\pm1°$) to which the system of the present invention is attempting to exert control; on the other hand, the hot water of hot water tank 324 has a temperature which is higher than the target paint temperature. Furthermore, going line 326 and returning line 327 are connected to the cold water tank 323, going line 328 and returning line 329 are connected to hot water tank 324; a three-way valve 330 of a type which enables the adjustment of flow amounts is incorporated in the diverging lines connected to going lines 326 and 328, while a three-way valve 331 which is of a type which permits the adjustment of flow amounts is incorporated in the diverging lines connected to returning lines 327 and 329. Cold water pump 332 is incorporated in going line 326, while hot water pump 333 is incorporated in going line 328.

The bottom of mixing tank 321 and painting booth 320 are connected by means of compression line 335; heat-exchanger 336 is incorporated in this compression line 335. Mixing tank 321 is communicated to the input side of the heat-receiver 336a of this heat-exchanger 336; the output side of this heat-receiver 336a is communicated to paint booth 320. Furthermore, the compression line 335 between mixing tank 321 and heat exchanger 336 has incorporated therein compression pipe 337, accumulator 338, and line filter 339.

The compression line 335 is connected to the input part of the painting robot which is provided in the interior of the painting booth 320; the return line 340 which is connected to the return part of this painting robot is connected to the upper part of mixing tank 321. Accordingly, the paint which is supplied under compression to the painting robot through the medium of compression line 335 can be applied to the automobile bodies within the painting booth, where necessary, or the paint can return to mixing tank 321 through the medium of return line 340 and thus cycle.

The input side of the heat-dissipater part 336b of the heat-exchanger 336 is connected to the three-way valve 330 through the medium of supply line 342; and the discharge side of heat-dissipater part 336b is connected to three-way valve 331 through the medium of discharge line 343. Furthermore, a measuring instrument 345 which measures the temperature of the material within discharge line 343 in the vicinity of three-way valve 331, and a temperature-adjusting instrument 346 which is connected to this measuring instrument 345 and three-way valve 331, are provided in the vicinity of three-way valve 331.

In addition, a measuring instrument 347 which measures the temperature of the material within compression line 335, is provided at compression line 335 between heat exchanger 336 and painting booth 320, and temperature-adjusting mechanism 348 is provided in the vicinity of measuring instrument 347, and a monitor 349 is connected to temperature-adjusting instrument 348 and a printer is connected to this monitor 349. Temperature-adjusting instrument 346 controls the opening of three-way valve 331, and temperature-adjusting instrument 348 controls the opening of three-way valve 330.

In FIG. 2, reference numeral 350 indicates a control apparatus such as a computer or the like; a temperature sensor 351 which measures the temperature of the ambient air is electrically connected to this control apparatus 350, and furthermore, a temperature sensor 352 which measures the temperature in the vicinity of painting booth 320 is also electrically connected to this control apparatus 350, and the three-way valve 353 which is incorporated in supply line 342 is electrically connected to this control apparatus 350, and in addition, measuring instrument 347 and temperature-adjusting instrument 348 are electrically connected thereto.

In FIG. 38, reference numeral B indicates automobile bodies (items to be painted) which are conveyed to painting booth 320; reference numeral 356 indicates a detecting apparatus which detects bodies B and operates control apparatus 350.

In the above structure, the paint-supplying means comprises drum can 322, mixing tank 321, and compression pipe 337, the cold water supply means comprises cold water tank 323 and cold water pump 332, the hot water supplying means comprises hot water tank 324 and hot water pump 333, and control apparatus 350 is provided with a comparing means, a control part, a comparing part, and a detection-control part.

Furthermore, although this is omitted in FIG. 38, a plurality of paint-supply means are connected to one painting booth 320 and a hot water supply means and a cold water supply means are provided for each paint supply means, and in addition, control apparatus 350 is connected to all of these; by means of the operation of the control means, the temperature adjustment of the paint which is provided at each paint-supply means, can be individually conducted as explained hereinafter.

Storage by color row 10 (see FIG. 1) is a line which reorders bodies B so that painting using the same color continues, in so far as possible. In the case in which painting using the same color does not continue, it rearranges the bodies so that the colors continue in such a manner that the previous color does not have any effect on the following color.

Next, the operation of a paint-temperature adjustment system with the above structure will be explained.

First, an unpainted automobile body B is conveyed in order from line R to painting booth 320. When body B reaches the interior of painting booth 320, the spraying of paint onto this body B by painting robots within painting booth 320 is carried out based on the detection by detecting apparatus 356, and the painting of body B is carried out.

When the painting of body B in painting booth 320 is finished, body B is conveyed to the following process along line R, and another unpainted body is conveyed to painting booth 320.

In order to conduct the painting of a body B, in painting booth 320, the paint stored in mixing tank 321 is conveyed under pressure to painting booth 320 by compression pump 337.

Then, in order to adjust the temperature of the paint which is sent under pressure to painting booth 320, the following processing is conducted.

First, when the paint passes through compression line 335, measuring instrument 347 detects the paint temperature, and the results of the measurement are sent to control apparatus 350. In the results of this measurement, when the comparing means which is incorporated in control apparatus 350 determines that the paint temperature is decreasing, the temperature-adjusting instrument 348 is operated and the three-way valve 330 is controlled, the amount of hot water supplied to the heat-exchanger 336 is increased and the amount of cold water supplied is reduced. Furthermore, when it is determined that the paint temperature is increasing from the results of the measurement of measuring instrument 347, the temperature-adjusting instrument 348 is operated and three-way valve 330 is controlled, and the amount of cold water supplied to heat-exchanger 336 is increased and the amount of hot water supplied is reduced. In this way, the amounts of hot and cold water sent to the heat exchanger by means of the adjustment of three-way valve 330 are adjusted and thereby the paint temperature can be adjusted. Even in the case in which the paint temperature is adjusted in the above manner, there are cases in which the paint temperature suddenly drops for a number of reasons. In these cases, the control apparatus 350 adjusts the opening of the three-way valve 330 through the medium of temperature adjustment instrument 348 so that a cold medium is not sent to heat exchanger 336 and adjusts the opening of three-way valve 330 so that a maximum amount of hot medium is continually sent to heat exchanger 336.

In the above manner, it is possible to adjust the paint temperature by adjusting the supply of hot and cold water.

While the opening of three-way valve 330 is being adjusted by control apparatus 350 through the medium of temperature-adjusting instrument 348, it is possible to display the difference between the actual value of the paint temperature and the target value of the paint temperature (for example 25° C.±1° C.) on monitor 49 by means of the comparing part which is provided in control apparatus 350. Furthermore, the comparing part of control apparatus 350 is also able to display on monitor 349 the control signal output to temperature-adjusting instrument 348 in addition to the target value and actual measured value of the paint temperature, and to print this as a graph on a printer which is not shown in the diagram. In this way, it is possible to know the difference between the target value and the actual measured value of the paint temperature displayed on monitor 349. In addition, in the case in which there is a large difference between the paint temperature and the control signal output, in other words, in the case in which the control signal output is increasing, but the actual measured value of the paint temperature is not corrected, but rather continues to decline, it is possible for the operator to conjecture from monitor 349 that there has been some type of breakdown in a part of the temperature management system, or that an abnormal state has occurred; it is then possible for the operator to quickly take counter measures. As a result, it is possible to avoid defects in painting on bodies of automobiles before they occur.

There are many types of automobile bodies B which are supplied to the production line, and they have numerous colors as well. In addition, the bodies B which are conveyed by the production line are not conveyed according to color; as a result of arrangement according to order or some other reason, they are conveyed in a random manner from the point of view of painting color.

In order to place these bodies B which are conveyed in a random state into a state in which prompt painting is possible with respect to any color, it is acceptable to conduct temperature-adjustment in the above manner with respect to all paint-sending means which are provided for each color; however, conducting detailed temperature adjustment with respect to all paints involves a great deal of wasted energy such as electricity and the like.

Here, the tracking data of the bodies B which approach painting booth 320 are read by detecting apparatus 356 and only the temperature adjusting means of the paint-sending means which is provided with the color of this body B is operated by control apparatus 350 and only the paint of this color is temperature-adjusted, while the temperature-adjustment means of other paints are temporarily stopped. If operations are conducted in this manner, it is possible to conduct the adjustment of the temperature of a necessary and sufficient amount of paint in an efficient manner without causing the waste of electric power.

The following relates to the case in which control of the temperature of a desired color of paint is begun some minutes before the arrival of a body B at the painting booth 320; here, in the case in which control of the paint temperature is begun in advance in a state in which the temperature of the paint is not being controlled, the approximate number of minutes from the beginning of control until the attainment of the desired paint temperature is measured in advance. In addition, it is preferable to set the detection timing of the detecting apparatus so that paint-temperature control is begun at a time before the arrival of a body B at painting booth 320, which permits the amount of time necessary for the temperature adjustment or a slightly greater amount of time.

Accordingly, for example, in a case in which 15 minutes are required to adjust the temperature of a specified color of paint to a set temperature, it is preferable that the detecting apparatuses be so set as to be operable 15 minutes before the time of the arrival of a body B at painting booth 320, thus beginning the control of the paint temperature.

In the process, prior to the entry into painting booth 320, in the case in which the bodies pass through the storage by color row 10, it is preferable that the control of the temperature of the color of paint of a body B be begun when this body B reaches the storage by color row 10.

In the storage by color row 10, the host computer of the production line conducts the color-changing of the bodies based on the tracking data of bodies B and stocks a specified number of bodies B on line. In addition, when the specified number of bodies B of each color are placed on the line of the storage by color row and stocked, the computer of the production line begins to convey bodies B having the same color in order to painting booth 320. Accordingly, by reading the tracking data stored in this host computer, or by reading the tracking data at specified positions of the storage by color row 10, it can be determined how many minutes later what color body will reach painting booth 320, so that after the bodies B have been rearranged by the storage by color row 10, it is preferable to operate the detection apparatuses so that control of the temperature of the paints with these colors is begun before the arrival of these bodies at painting booth 320, thus beginning temperature control.

By proceeding in this manner, it is possible to arrange the bodies B which are sent to painting booth 320 according to color, and at the same time, it is possible to efficiently control the temperature of the smallest amount of paints possible, so that it is possible to efficiently conduct high-quality painting.

In the above example, a case was explained in which the present invention was applied to an automated production line and painting booth, and in which automobile bodies were selected as the items to be painted; however, it is of course possible to apply the present invention to production lines for other types of items in addition to painting, and to apply the present invention to painting booths for other types of items.

As explained above, by means of the present invention, it is possible to determine the colors which are necessary for painting by means of reading the tracking data attached to items to be painted such automobile bodies which approach a painting booth by means of a detecting apparatus, and based on the results of this determination, to adjust the temperature of only those paint-sending means having a color of paint which corresponds to the bodies which are approaching the painting booth among the plurality of painting means which are connected to the painting booth.

Accordingly, in comparison with conventional systems which conducted the adjustment of temperature of all paints irrespective of the presence or absence of bodies in the vicinity of the painting booth, it is possible to realize a remarkable savings in energy, and to conduct the accurate temperature adjustment to a desired temperature of the paints which are necessary for the painting in the painting booth before the arrival of items to be painted at the painting booth.

Furthermore, if the tracking data are read at the color-changing means step before the entry into the painting booth, then even in the case in which various items to be painted having differing painting colors are conveyed randomly along the line, it is possible to efficiently paint the items to be painted having the same painting colors, and thus to reduce the amount of energy which is required for the paint-temperature adjustment at that time.

C: Modifications

In the above examples, the following modifications are possible.

(a) Shift register 80 was divided into a number of zones corresponding to limit switches LS; however, if there is no particular such necessity, it is permissible to omit such division of shift register 80.

(b) The example had a structure in which a plurality of blocks were provided; however, in the case in which the scale of the production line is small, or the like, a one-block structure is permissible.

(c) In the example, the rewriting of memory M at the time of the transfer of body B between blocks was accomplished by first substituting the identification number of transfer apparatuses 58a and 58b and then writing a new hanger number. In contrast, it is permissible to omit the identification numbers of the transfer apparatuses and to substitute the hanger number of a new hanger on which a body B is placed.

(d) In the example, the actual vehicle number of the following process was detected from the tracking data. However, it is possible to detect this number by means of a different method. For example, it is acceptable to provide an apparatus for counting the hangers at the entrance or exit of the following process and thus to detect the actual vehicle number from the difference between the number of hangers which enter and the number of hangers which exit.

(e) In the example, the alarm generating means emits an alarm. However, it is possible to conduct a display which will visually engage the attention of the operator.

(f) A structure in which the operator views the screen of CRT display apparatus 103 and directly conducts remote manipulation on the diverging apparatus is also acceptable. That is, a structure in which the diverging cylinder 123 is controlled by means of radio or wiring is also acceptable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A production management system comprising:
(a) a plurality of conveying blocks provided in a consecutive manner and having
a plurality of conveying means for conveying an item to be processed which is placed in an input part to a sending part,
identification codes attached to each of said conveying means,
reading means for reading said identification codes of the conveying means in said input part, and
register means having a plurality of memory areas connected in a consecutive manner, identification codes read by said reading means being input into the initial step memory area, the register means successively shifting the inputted identification codes in the direction of the final step memory area, provided there are empty memory areas, and discharging said identification code of a conveying means from the final step memory area when an item to be processed is sent from said conveying means in said sending part;
(b) transfer means for transferring an item to be processed which is sent from previous conveying block to said conveying means at an input part after the conveying block;
(c) input means for inputting data relating to items to be processed which are placed in said input part of initial step conveying block of said conveying blocks;
(d) memory means for storing the identification code read by said reading means of said initial step conveying block and the data inputted by said inputting means as a set each time an item to be processed is positioned in the conveying means of said initial step conveying block; and
(e) rewriting means for writing said identification code read by said reading means of said following conveying block in place of said identification code in said memory means relating to an item to be processed when the item to be processed is transferred by said transfer means;

a characteristic identification code being attached to the transfer means, the identification code relating to an item to be processed in said memory means being replaced by the identification code of the transfer means by said rewriting means while said item to be processed is in the transfer means, and after the item to be processed has been transferred, said rewriting means replaces said characteristic identification code with an identification code read by said reading means of the following conveying block.

2. A production management system comprising:

(a) a plurality of conveying blocks provided in a consecutive manner and having a plurality of conveying means for conveying an item to be processed which is placed in an input part to a sending part, identification codes attached to each of said conveying means, reading means for reading said identification codes of the conveying means in said input part, and register means having a plurality of memory areas connected in a consecutive manner, identification codes read by said reading means being input into the initial step memory area, the register means successively shifting the inputted identification codes in the direction of the final step memory area, provided there are empty memory areas, and discharging said identification code of a conveying means from the final step memory area when an item to be processed is sent from said conveying means in said sending part;

(b) transfer means for transferring an item to be processed which is sent from previous conveying block to said conveying means at an input part after the conveying block;

(c) input means for inputting data relating to items to be processed which are placed in said input part of initial step conveying block of said conveying blocks;

(d) memory means for storing the identification code read by said reading means of said initial step conveying block and the data inputted by said inputting means as a set each time an item to be processed is positioned in the conveying means of said initial step conveying block;

(e) rewriting means for writing said identification code read by said reading means of said following conveying block in place of said identification code in said memory means relating to an item to be processed when the item to be processed is transferred by means of said transfer means; and (f) detecting means for detecting the passage of said conveying means provided in the conveying circuit from said input part to said sending part, and wherein said register means is divided into a plurality of sections by borders corresponding to said detecting means, and when the identification code is inputted into the initial memory area of each section, this identification code is successively shifted into the following memory areas provided empty areas exist, and when the passage of a conveying means is detected by means of said detecting means, the identification code in the final memory area of a section preceding the corresponding border is shifted into said initial memory area of the following section.

3. A production management system comprising:

a plurality of conveying means for conveying items to be processed which are placed in an input part to a sending part, identification codes attached to each of said conveying means, first reading means for reading said identification codes of said conveying means in said input part, input means for inputting data related to items to be processed which are placed in said input part, memory means for storing identification codes read by said first reading means and data inputted by said input means as a set each time an item to be processed is placed in said conveying means, robots for conducting various types of processing on the items to be processed, provided in the movement path of said conveying means, second reading means for reading said identification codes of conveying apparatuses which enter on the side of said robots, provided on an upstream side of said robots, referring means for referring to the interior of said memory means using the identification codes read by said second reading means and for outputting corresponding data, control means for controlling operations of said robots in accordance with data outputted by said referring means, register means having a plurality of memory areas connected in a consecutive manner for inputting identification codes read by said first reading means into an initial step memory area, for successively shifting the inputted identification codes in the direction of a final-step memory area, provided there are empty memory area, and discharging said identification code of a conveying means from a final memory area when an item to be processed is sent from said conveying means in said sending part, judgment means for comparing said identification code shifted to a memory area corresponding to said second reading means among the memory areas of said register means and said identification code read by said second memory means and, in the case of nonagreement therebetween, outputting message data cancelling the processing of said referring means, and display means for displaying message data outputted by said judgment means, provided in the vicinity of said robots.

4. A production management system being provided with:

(a) a plurality of conveying blocks provided in a consecutive manner and having a plurality of conveying means for conveying an item to be processed which is placed in an input part to a sending part, identification codes attached to each of said conveying means, and first reading means for reading said identification codes of the conveying means in said input part;

(b) transfer means for transferring an item to be processed which is sent from previous conveying block to said conveying means at input part of following step conveying block;

(c) input means for inputting data relating to items to be processed which are placed in an input part of said initial step conveying block of said conveying blocks;

(d) memory means for storing the identification code read by said first reading means of the initial conveying block and the data inputted by said inputting means as a set each time an item to be processed is positioned in the conveying means of said initial step conveying block;

(e) rewriting means for writing the identification code read by said first reading means of the following conveying block in place of the identification code in said memory means relating to an item to be processed when the item to be processed is transferred by means of said transfer means, (f) robots for conducting various types of processing on said items to be processed, provided in the conveying path of at least one conveying block;

(g) second reading means for reading identification codes of conveying apparatuses introduced on the side of said robots, provided on the upstream side of said robots;

(h) referring means for referring to the interior of said memory means using identification codes read by said second reading means, and for outputting the corresponding data; and (i) control means for controlling operations of said robots in accordance with the data outputted by said referring means, wherein the conveying blocks which have said robots are provided with:

register means having a plurality of memory areas connected in a consecutive manner for inputting identification codes read by said reading means into an initial step memory area, for successively shifting the inputted identification codes in the direction of the final step memory area, provided there are empty memory areas, and for discharging the identification code of a conveying means from the final memory area when an item to be processed is sent from said conveying means in said sending part, judgment means for comparing an identification code shifted to a memory area corresponding to said second reading means among the memory areas of said register means and said identification code read by said second memory means and, in the case of nonagreement therebetween, outputting message data cancelling the processing of said referring means, and display means for displaying message data outputted by said judgment means, provided in the vicinity of said robots.

5. A production management system comprising:

a plurality of conveying means for conveying items to be processed which are placed in an input part to a sending part, identification codes attached to each of said conveying means, reading means for reading the identification codes of the conveying means in said input part, detecting means for detecting said passage of said conveying means, provided in the conveying circuit from said input part to the sending part, register means having a plurality of memory areas connected in a consecutive manner which are divided into a plurality of sections according to borders corresponding to said detection means, for successively shifting an identification code which is inputted into the initial-step memory area of each section to following step memory areas, provided empty areas exist, and, when a passage of the conveying means is detected by said detecting means, shifting the identification code within the final-step memory area of the section preceding the border corresponding to this detection means into the initial-step memory area of the following section and inputting the identification code read by said reading means into the initial-step section, and discharging the identification code of a conveying means from a final-step section when an item to be processed is sent from the conveying means in said sending part, input means for inputting data relating to items to be processed which are placed in said input part, memory means for storing the identification code read by said reading means and data inputted by said input means as a set each time an item to be processed is placed in the conveying means of said initial part, display means for correlating the memory contents of at least one of said memory means and said register means with the position of each of said memory area and displaying this, section indicating means for indicating one of said sections, reading means for reading an identification code corresponding to the indicated section from said register means and displaying at least one of the data and the identification codes in said display means, identification code selection means for selecting one of the identification codes read by said reading means, and correcting means for correcting the identification code selected by said identification code selection means.

6. A production management system comprising:

a plurality of conveying means for conveying items to be processed which are placed in an input part to a sending part, identification codes attached to each of said conveying means, reading means for reading the identification codes of the conveying means in said input part, detecting means for detecting said passage of said conveying means, provided in the conveying circuit from said input part to the sending part, register means having a plurality of memory areas connected in a consecutive manner which are divided into a plurality of sections according to borders corresponding to said detection means, for successively shifting an identification code which is inputted into the initial-step memory area of each section to following step memory areas, provided empty areas exist, and, when a passage of the conveying means is detected by said detecting means, shifting the identification code within the final-step memory area of the section preceding the border corresponding to this detection means into the initial-step memory area of the following section and inputting the identification code read by said reading means into the initial-step section, and discharging the identification code of a conveying means from a final-step section when an item to be processed is sent from the conveying means in said sending part, input means for inputting data relating to items to be processed which are placed in said input part, memory means for storing the identification code read by said reading means and data inputted by said input means as a set each time an item to be processed is placed in the conveying means of said initial part, display means for correlating the memory contents of at least one of said memory means and said register means with the position of each of said memory area and displaying this, section indication means for indicating one of said sections, reading means for reading identification codes corresponding to the indicated section from said register means and displaying at least one of the data and the identification codes in said displaying means, scope indicating means for indicating a number of consecutive identification codes read by means of said reading means, memory area indicating means for indicating one of the memory areas of the section indicated by means of said section indicating means, and reinputting means for reinputting the identification code in each memory read so that each identification code indicated by said scope indicating means comes after the area indicated by said memory area indicating means.

7. A production management system comprising:

a plurality of conveying means for conveying items to be processed which area placed in an input part to a sending part, identification codes attached to each of said conveying means, reading means for reading the identification codes of the conveying means in said input part, detecting means for detecting said passage of said conveying means, provided in the conveying circuit from said input part to the sending part, register means having a plurality of memory areas connected in a consecutive manner which are divided into a plurality of sections according to borders corresponding to said detection means, for successively shifting an identification code which is inputted into the initial-step memory area of each section to following step memory areas, provided empty areas exist, and, when a passage of the conveying means is detected by said detecting means, shifting the identification code within the final-step memory area of the section preceding the border corresponding to this detection means into the initial-step memory area of the following section and inputting the identification code read by said reading means into the initial-step section, and discharging the identification code of a conveying means from a final-step section when an item to be processed is sent from the conveying means in said sending part, input means for inputting data relating to items to be processed which are placed in said input part, memory means for storing the identification code read by said reading means and data inputted by said input means as a set each time an item to be processed is placed in the conveying means of said initial part, display means for correlating the memory contents of at least one of said memory means and said register means with the position of each of said memory area and displaying this, section indicating means for indicating one of said sections, reading means for reading identification codes corresponding to the indicated section and data corresponding thereto from said memory means, and displaying the at least one of the data and identification codes in said display means, selecting means for selecting one of each of the identification codes and data read by said reading means, and correcting means which writes over the identification codes or data selected by said selecting means.

8. A production management system comprising:

a plurality of conveying means for conveying items to be processed which are placed in an input part to a sending part, identification codes attached to each of said conveying means, reading means for reading the identification codes of the conveying means in said input part, detecting means for detecting said passage of said conveying means, provided in the conveying circuit from said input part to the sending part, register means having a plurality of memory areas connected in a consecutive manner which are divided into a plurality of sections according to borders corresponding to said detection means, for successively shifting an identification code which is inputted into the initial-step memory area of each section to following step memory areas, provided empty areas exist, and, when a passage of the conveying means is detected by said detecting means, shifting the identification code within the final-step memory area of the section preceding the border corresponding to this detection means into the initial-step memory area of the following section and inputting the identification code read by said reading means into the initial-step section, and discharging the identification code of a conveying means from a final-step section when an item to be processed is sent from the conveying means in said sending part, input means for inputting data relating to items to be processed which are placed in said input part, memory means for storing the identification code read by said reading means and data inputted by said input means as a set each time an item to be processed is placed in the conveying means of said initial part, display means for correlating the memory contents of at least one of said memory means and said register means with the position of each of said memory area and displaying this, identification code indicating means for indicating an identification code, reading means for reading data corresponding to the indicated identification codes from said memory means and displaying at least one of the data and identification codes in said displaying means, selecting means for selecting one of the data read by said reading means, and correcting means for correcting data selected by said selecting means.

* * * * *